(12) United States Patent
Lindelöf

(10) Patent No.: US 10,611,380 B2
(45) Date of Patent: Apr. 7, 2020

(54) METHOD AND SYSTEM FOR ASSESSING THE TRIP PERFORMANCE OF A DRIVER

(71) Applicant: GREATER THAN S.A., Brussels (BE)

(72) Inventor: Anders Lindelöf, Värmdö (SE)

(73) Assignee: GREATER THAN AB, Stockholm (SE)

( * ) Notice: Subject to any disclaimer, the term of this patent is extended or adjusted under 35 U.S.C. 154(b) by 60 days.

(21) Appl. No.: 15/781,109

(22) PCT Filed: Dec. 15, 2016

(86) PCT No.: PCT/SE2016/051264
§ 371 (c)(1),
(2) Date: Jun. 1, 2018

(87) PCT Pub. No.: WO2017/105330
PCT Pub. Date: Jun. 22, 2017

(65) Prior Publication Data
US 2018/0345984 A1 Dec. 6, 2018

(30) Foreign Application Priority Data
Dec. 15, 2015 (SE) ...................................... 1551651

(51) Int. Cl.
*B60W 40/09* (2012.01)
*G07C 5/00* (2006.01)
(Continued)

(52) U.S. Cl.
CPC ............ *B60W 40/09* (2013.01); *B60K 28/02* (2013.01); *G06Q 10/06* (2013.01);
(Continued)

(58) Field of Classification Search
None
See application file for complete search history.

(56) References Cited

U.S. PATENT DOCUMENTS

| 6,242,873 B1 * | 6/2001 | Drozdz | ..................... | B60K 6/46 |
| | | | | 318/139 |
| 9,141,996 B2 * | 9/2015 | Christensen | ....... | G06Q 30/0208 |
| (Continued) | | | | |

FOREIGN PATENT DOCUMENTS

DE 10056756 A1 5/2002
EP 2924624 A1 9/2015
(Continued)

OTHER PUBLICATIONS

International Search Report and Written Opinion from counterpart International Patent Application No. PCT/SE2016/051264, dated Mar. 6, 2017.
(Continued)

*Primary Examiner* — Steven Lim
*Assistant Examiner* — Muhammad Adnan
(74) *Attorney, Agent, or Firm* — Tucker Ellis LLP

(57) ABSTRACT

Method for automatically assessing performance of a driver (110) of a vehicle (100) for a particular trip, wherein current driving data sets, comprising basic driving data are repeatedly read from the vehicle, which method comprises the steps a) collecting previous-trip driving data sets, comprising instantaneous vehicle energy consumption, for different previous trips, different drivers and different vehicles; b) for each of said current-trip driving data sets, selecting at least one corresponding previous-trip driving data set; c) calculating a relative instantaneous vehicle energy consumption value for said selected corresponding previous-trip driving data set or sets, which is relative to a total energy consumption for a respective trip during which the previous-trip driving data set in question was observed; d) calculating a value of the said first trip performance parameter based upon an average value of said calculated relative instantaneous energy consumptions. The invention also relates to a system.

18 Claims, 22 Drawing Sheets

(51) Int. Cl.
*G06Q 10/06* (2012.01)
*G07C 5/08* (2006.01)
*B60K 28/02* (2006.01)
*G06Q 40/08* (2012.01)
*G06Q 50/30* (2012.01)

(52) U.S. Cl.
CPC ....... *G06Q 10/06393* (2013.01); *G06Q 40/08* (2013.01); *G06Q 50/30* (2013.01); *G07C 5/008* (2013.01); *G07C 5/0808* (2013.01); *G07C 5/0841* (2013.01); *B60W 2510/0638* (2013.01); *B60W 2510/0652* (2013.01); *B60W 2520/10* (2013.01); *B60W 2520/105* (2013.01); *B60W 2550/402* (2013.01); *B60W 2750/40* (2013.01)

(56) References Cited

U.S. PATENT DOCUMENTS

| | | | | |
|---|---|---|---|---|
| 9,147,353 | B1* | 9/2015 | Slusar | G09B 19/167 |
| 9,390,452 | B1* | 7/2016 | Biemer | G06Q 40/08 |
| 9,517,773 | B2* | 12/2016 | Roos | B60W 50/14 |
| 9,922,469 | B1* | 3/2018 | Ashton | G07C 5/08 |
| 10,056,008 | B1* | 8/2018 | Sweany | G09B 19/167 |
| 10,482,685 | B1* | 11/2019 | Iqbal | G07C 5/008 |
| 2005/0085953 | A1* | 4/2005 | Hoenninger | F02D 41/266 |
| | | | | 701/1 |
| 2005/0131597 | A1* | 6/2005 | Raz | G07C 5/085 |
| | | | | 701/29.1 |
| 2007/0129878 | A1* | 6/2007 | Pepper | B60W 40/12 |
| | | | | 701/123 |
| 2010/0145571 | A1* | 6/2010 | Kwon | G01C 21/26 |
| | | | | 701/31.4 |
| 2011/0112717 | A1* | 5/2011 | Resner | G07C 5/008 |
| | | | | 701/31.4 |
| 2011/0144839 | A1* | 6/2011 | Pudar | B60W 40/09 |
| | | | | 701/22 |
| 2011/0161138 | A1* | 6/2011 | Keaveny | G06Q 10/06 |
| | | | | 705/7.38 |
| 2011/0307188 | A1 | 12/2011 | Peng et al. | |
| 2012/0065834 | A1* | 3/2012 | Senart | G07C 5/008 |
| | | | | 701/31.4 |
| 2013/0006674 | A1* | 1/2013 | Bowne | H04W 4/40 |
| | | | | 705/4 |
| 2013/0096895 | A1* | 4/2013 | Willard | B60K 37/02 |
| | | | | 703/8 |
| 2013/0164712 | A1* | 6/2013 | Hunt | B60W 40/09 |
| | | | | 434/65 |
| 2013/0209968 | A1* | 8/2013 | Miller | B60R 16/0236 |
| | | | | 434/65 |
| 2013/0231854 | A1* | 9/2013 | Rovik | B60R 16/0236 |
| | | | | 701/123 |
| 2014/0199662 | A1 | 7/2014 | Armitage et al. | |
| 2014/0214311 | A1* | 7/2014 | Stevens | G06Q 10/04 |
| | | | | 701/123 |
| 2014/0278574 | A1* | 9/2014 | Barber | B60W 40/09 |
| | | | | 705/4 |
| 2014/0372017 | A1* | 12/2014 | Armitage | B60W 40/09 |
| | | | | 701/117 |
| 2015/0298689 | A1* | 10/2015 | Schwartz | B60W 20/12 |
| | | | | 701/22 |
| 2015/0317844 | A1* | 11/2015 | Choi | G07C 5/008 |
| | | | | 701/29.3 |
| 2016/0075341 | A1* | 3/2016 | Arvidsson | B60K 6/46 |
| | | | | 701/22 |
| 2017/0103101 | A1* | 4/2017 | Mason | G06F 16/215 |

FOREIGN PATENT DOCUMENTS

| | | |
|---|---|---|
| WO | 2008107514 A1 | 9/2008 |
| WO | 2010011806 A1 | 1/2010 |

OTHER PUBLICATIONS

Castignani, German et al., "Driver Behavior Profiling Using Smartphones: A Low-Cost Platform for Driver Monitoring", IEEE Intelligent Transportation System Magazine, vol. 7, No. 1, p. 91-102, IEEE, USA published Jan. 20, 2015.

Claims from International Publication No. WO 2017/105328, Dated Jun. 22, 2017, Corresponding to International Application No. PCT/SE2016/051262, Filed Dec. 15, 2016, which entered the US National Phase with the instant application.

Claims from International Publication No. WO 2017/105329, Dated Jun. 22, 2017, Corresponding to International Application No. PCT/SE2016/051263, Filed Dec. 15, 2016, which entered the US National Phase with the instant application.

Claims from International Publication No. WO 2017/105327, Dated Jun. 22, 2017, Corresponding to International Application No. PCT/SE2016/051261, Filed Dec. 15, 2016, which entered the US National Phase with the instant application.

Claims from International Publication No. WO 2017/105331, Dated Jun. 22, 2017, Corresponding to International Application No. PCT/SE2016/051265, Filed Dec. 15, 2016, which entered the US National Phase with the instant application.

Claims from International Publication No. WO 2017/105332, Dated Jun. 22, 2017, Corresponding to International Application No. PCT/SE2016/051266, Filed Dec. 15, 2016, which entered the US National Phase with the instant application.

Claims from International Publication No. WO 2017/105333, Dated Jun. 22, 2017, Corresponding to International Application No. PCT/SE2016/051267, Filed Dec. 15, 2016, which entered the US National Phase with the instant application.

* cited by examiner

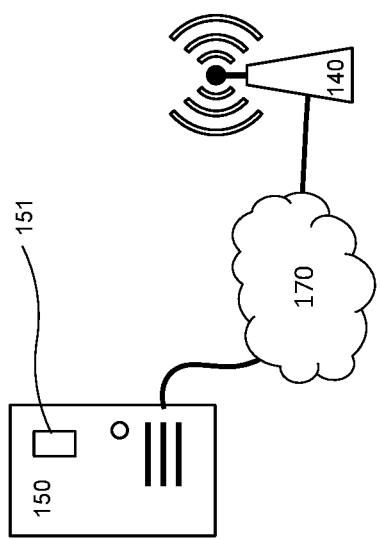
Fig. 1A
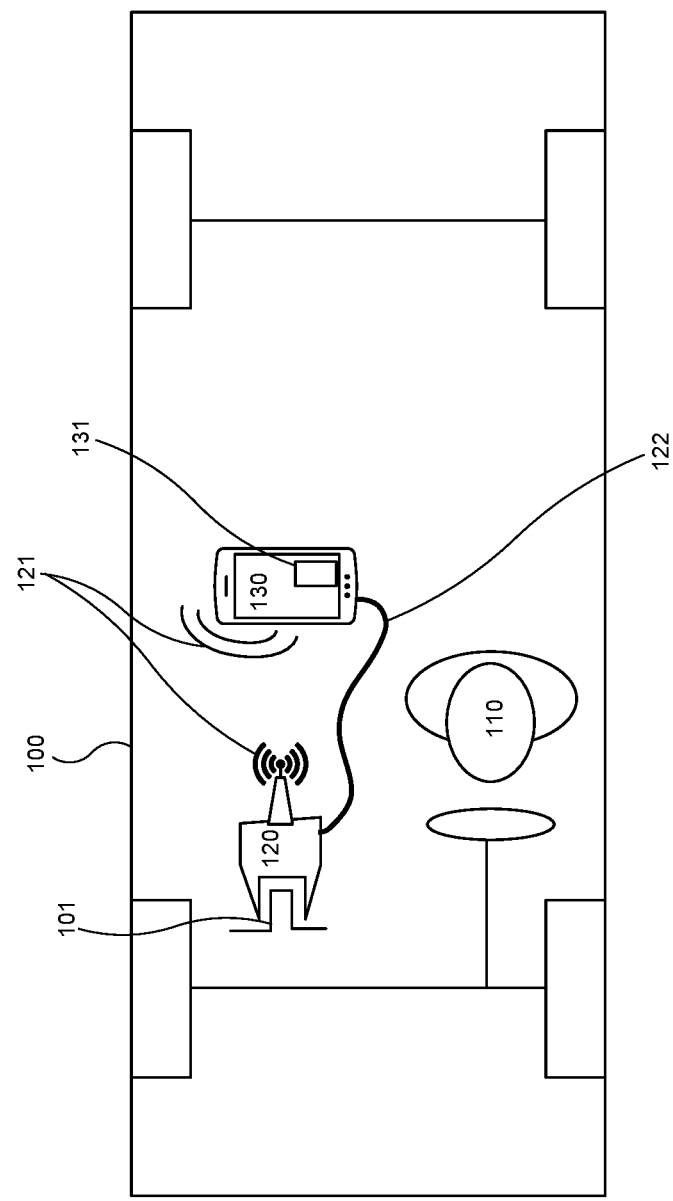

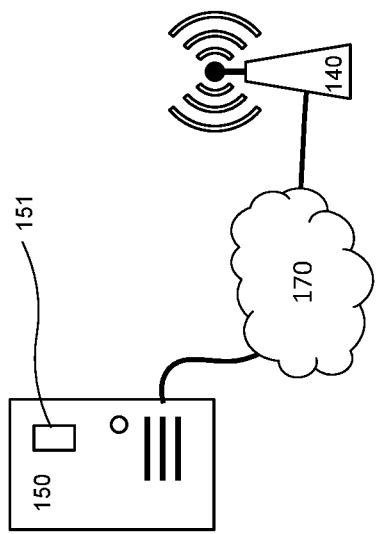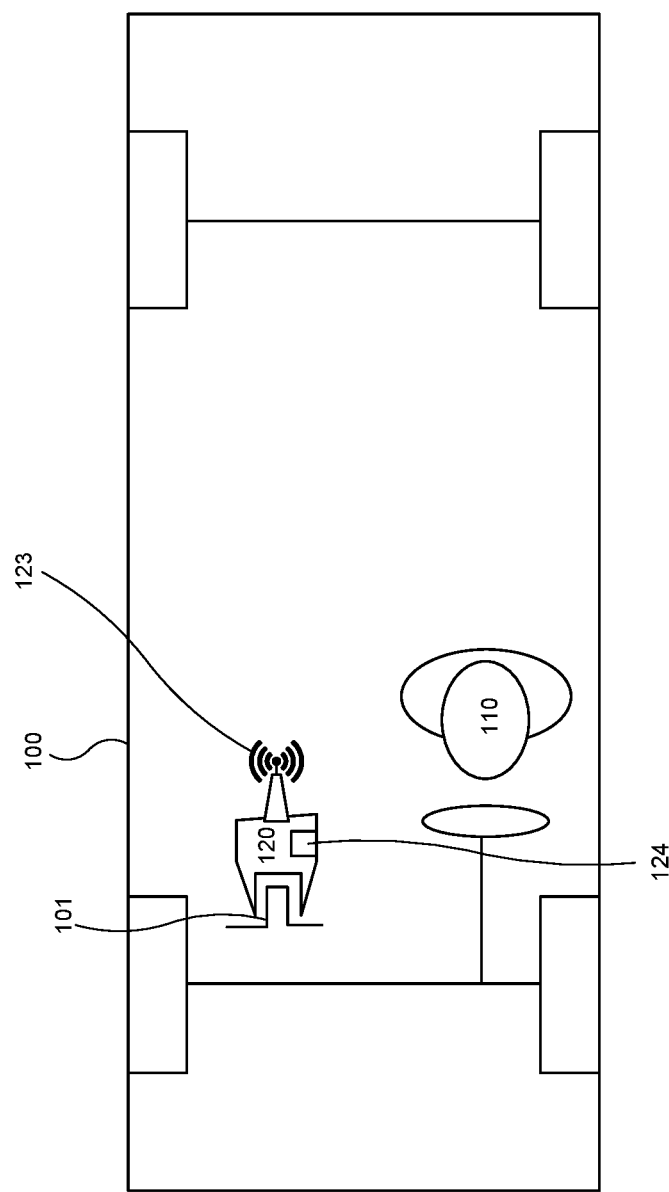
Fig. 1B

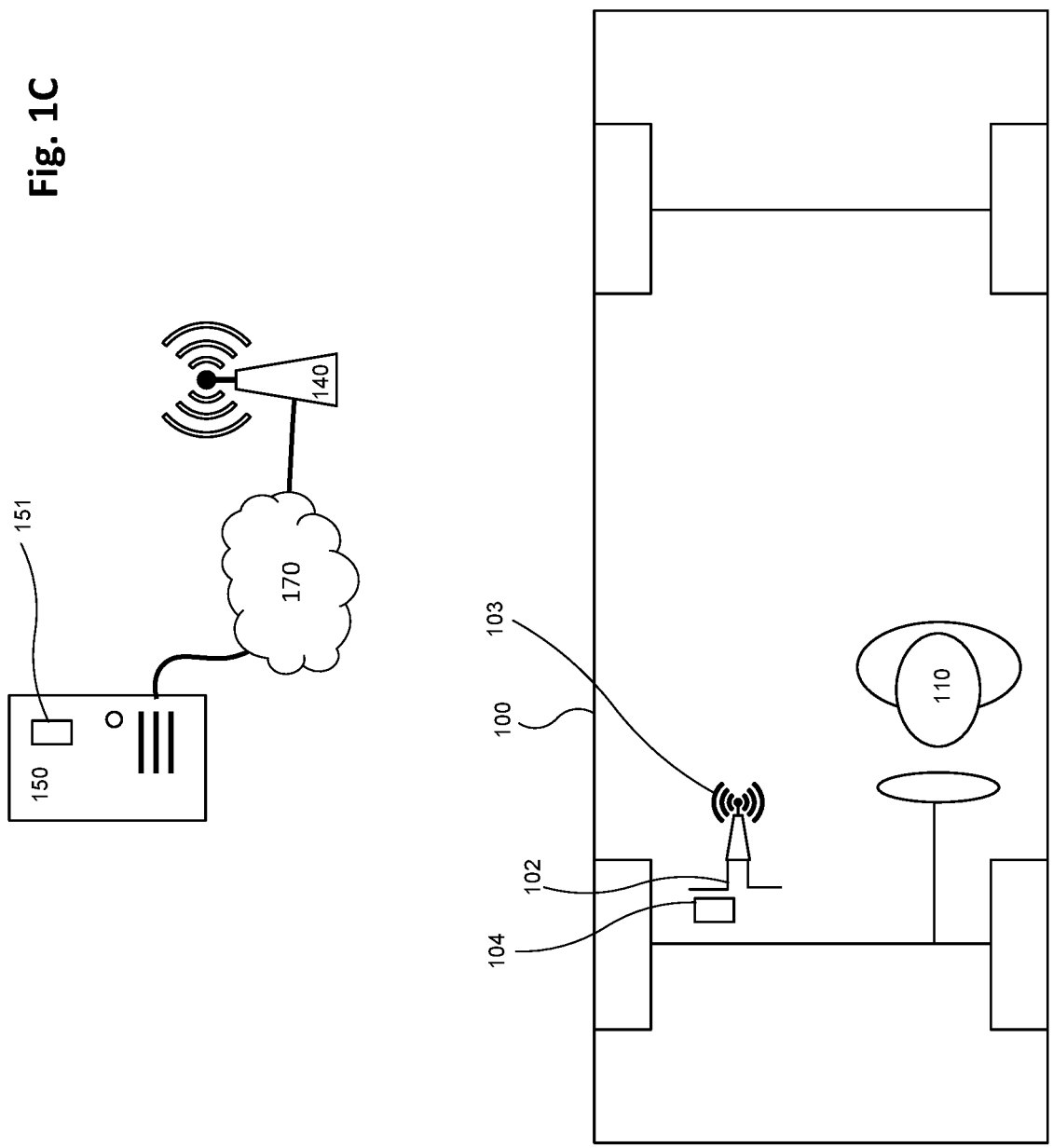

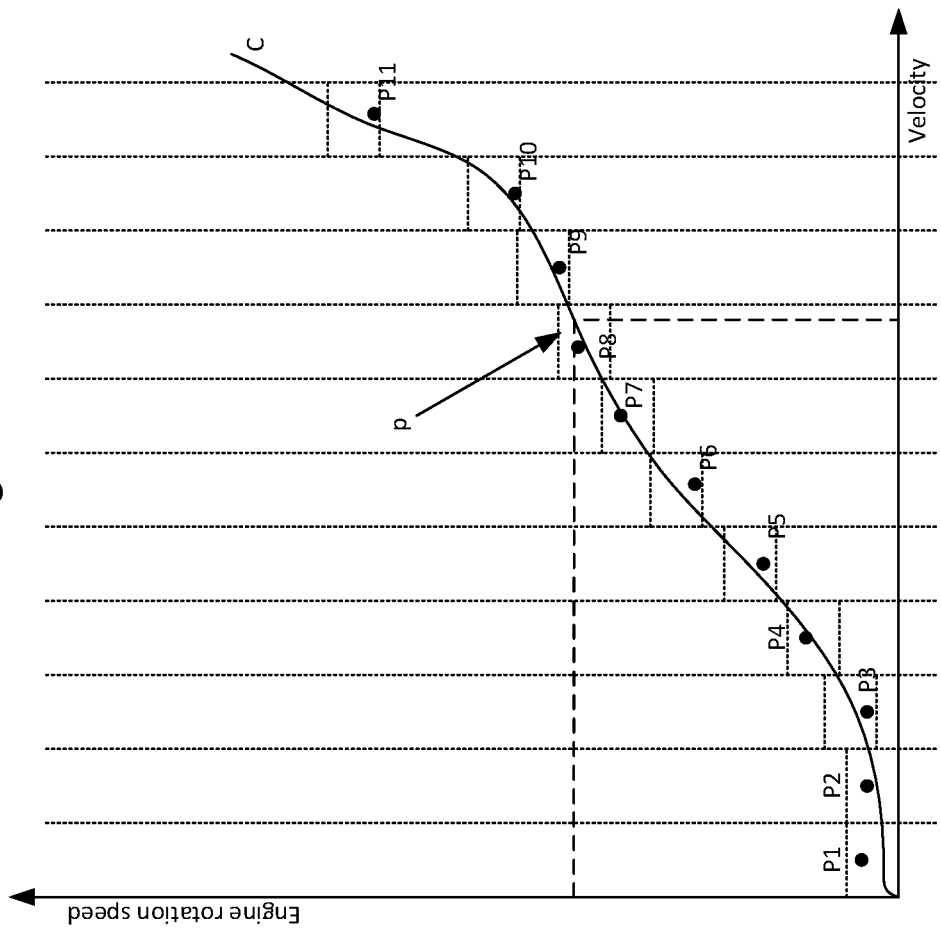

METHOD AND SYSTEM FOR ASSESSING THE TRIP PERFORMANCE OF A DRIVER

TECHNICAL FIELD

The present invention relates to a method for assessing the trip performance of a driver. In particular, the invention relates to such assessment in relation to a driver of a vehicle, such as a motor vehicle. In some aspects, the invention also relates to such assessment in relation to a driver of a non-motorized vehicle, such as a bike. Furthermore, the invention relates to a system.

BACKGROUND OF THE INVENTION

Today, an abundance of data is available electronically during and after driving of various vehicles, such as trip computers providing information about a current trip performed using a vehicle; standardized digital interfaces, such as a CAN-bus based interface, arranged in vehicles and arranged to provide vehicle- and driving-related data to hardware appliances pluggable into the vehicle using such interfaces; and data available from standalone portable equipment, such as smartphones and GPS equipment, arranged in the vehicle during use. Such data is today used for traffic information purposes, by wirelessly collecting current driving data for many vehicles, such as using the internet, and calculating expected travelling times, performing route planning and so forth.

At the same time, there is an increasing need, for reasons of environmental concern, economy, risk management, etc., of measuring the driving performance of individual vehicle drivers and groups of drivers. For instance, by measuring fuel consumption, it may be possible to determine how environmentally friendly the driving style of a particular driver is. In the extension, such information may be used to, for instance, keep track on the total environmental impact of a fleet of vehicles. Also, such information can be used for feedback purposes, in order to improve performance over time for individual drivers as well as on an aggregate level.

However, since different vehicles have typical fuel consumption profiles, and since identical vehicles can perform very differently under different conditions in terms of load, traffic situation, road conditions, and so forth, only using fuel consumption is a blunt measure. In addition to this, reliable fuel consumption data is not readily available for many types of vehicles. For non-motorized vehicles, such as bikes, fuel consumption is not relevant at all as a measurement value for a particular trip with such vehicle.

BRIEF SUMMARY OF THE INVENTION

Hence, there is a need for a way to more accurately measure driving performance of vehicle drivers, in particular for individual trips, which may be used both for comparing relative driving performance from various perspectives between different trips by the same driver/vehicle combination as well as across several drivers/vehicles.

The present invention solves these problems.

Hence, the invention relates to a method for automatically assessing performance of a driver of a current vehicle for a particular current trip, wherein updated current-trip driving data sets are repeatedly read from the vehicle, which current-trip driving data sets each comprises data from at least a predetermined set of basic driving data parameters, wherein new such current-trip driving data sets are read from the vehicle (100) at consecutive observation time points separated by at the most a predetermined observation time period, which method is characterised in that the method comprises calculating the value of a first energy-based trip performance parameter by the steps a) collecting previous-trip driving data sets, observed at a plurality of different observation time points, for a plurality of different previous trips made by a plurality of different drivers and a plurality of different vehicles, which previous-trip driving data sets each comprises parameter values for at least a certain predetermined set of qualified driving data parameters in turn comprising the basic parameter set and in particular instantaneous vehicle energy consumption; b) for each of said current-trip driving data sets, selecting at least one corresponding previous-trip driving data set based upon a basic driving data set similarity measure, arranged to measure similarity between driving data sets, and/or based upon a basic group conformity measure arranged to measure conformity for a current-trip driving data set to a basic historic group of previous-trip driving data sets; c) calculating a relative instantaneous vehicle energy consumption value for said selected corresponding previous-trip driving data set or sets, which relative energy consumption is relative to a total energy consumption for a respective trip during which the previous-trip driving data set in question was observed; and d) calculating a value of the first trip performance parameter based upon an average value of said calculated relative instantaneous energy consumptions.

The invention further relates to a system for automatically assessing performance of a driver of a current vehicle for a particular current trip, which system is arranged to repeatedly read updated current-trip driving data sets from the vehicle, which current-trip driving data sets each comprises data from at least a predetermined set of basic driving data parameters, wherein the system is arranged to read new such current-trip driving data sets from the vehicle at consecutive observation time points separated by at the most a predetermined observation time period, which system is characterised in that the system comprises a server arranged to calculate the value of a first energy-based trip performance parameter, in that the server is arranged to collect previous-trip driving data sets, observed at a plurality of different observation time points, for a plurality of different previous trips made by a plurality of different drivers and a plurality of different vehicles, which previous-trip driving data sets each comprises parameter values for at least a certain predetermined set of qualified driving data parameters in turn comprising the basic parameter set and in particular instantaneous vehicle energy consumption, in that the server is arranged to, for each of said current-trip driving data sets, select at least one corresponding previous-trip driving data set based upon a basic driving data set similarity measure, arranged to measure similarity between driving data sets, and/or based upon a basic group conformity measure arranged to measure conformity for a current-trip driving data set to a basic historic group of previous-trip driving data sets, in that the server is arranged to calculate a relative instantaneous vehicle energy consumption value for said selected corresponding previous-trip driving data set or sets, which relative energy consumption is relative to a total energy consumption for a respective trip during which the previous-trip driving data set in question was observed, and in that the server is arranged to calculate a value of the first trip performance parameter based upon an average value of said calculated relative instantaneous energy consumptions.

BRIEF DESCRIPTION OF THE DRAWINGS

In the following, the invention will be described in detail, with reference to exemplifying embodiments of the invention and to the enclosed drawings, wherein:

FIGS. 1A-1D are respective simplified views of a vehicle showing respective parts of a system according to four different embodiments of the present invention, which systems are arranged to perform a method according to the present invention;

FIGS. 6A and 6B illustrate a mapping of a particular vehicle to a particular vehicle class;

The figures share reference numerals for same or corresponding parts.

DETAILED DESCRIPTION OF THE INVENTION

Figure 1D:
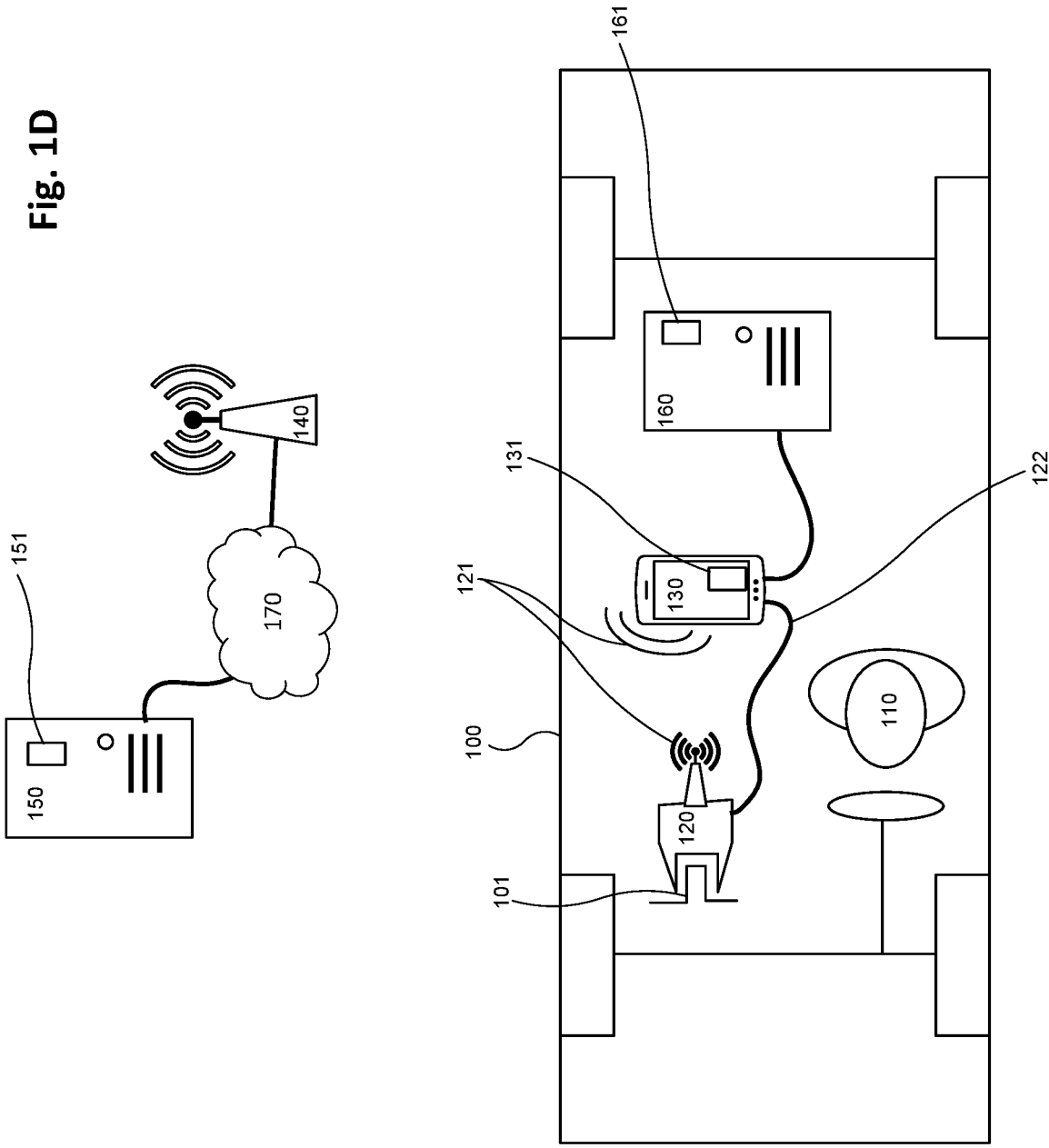

In general, the present invention relates to a method and a system for automatically assessing performance of a driver of a current vehicle for a particular current trip.

Herein, the term "performance" relates to a quantifiable, in particular measurable and/or calculable, quality of a particular trip driven by a particular driver, and in particular in relation to the driving of the driven vehicle as such. A "performance parameter" or "performance measure" is a well-defined parameter the value of which is a measure of the quality in some respect of the trip in question. Such quality may be in terms of environmental footprint, risk of accidents, driver stress level, vehicle wear or any other quantifiable metric relating to the driven trip.

Furthermore, herein the term "trip" means a journey performed using a particular vehicle and as controlled by a particular driver of the vehicle in question. A trip may be a round trip or a single way trip. When a trip starts and ends may be determined manually by the driver, and/or may be determined automatically based upon location or velocity data, or similar.

A "current vehicle" means a vehicle which has performs, currently performs or will perform a "current trip" in the sense of the present invention, namely a trip for which a performance measure is calculated or is to be calculated according to one or several of the preferred embodiments described herein.

A "vehicle" can be a car, a bus, a truck, a motorcycle, or any other motorized vehicle, such as a gasoline-, diesel- or gas-propelled vehicle, of a vehicle propelled by any other flammable carbohydrate or non-carbohydrate based fuel, comprising an explosion motor; or an electrically powered vehicle comprising an electrical motor and a battery. It may also, in some embodiments, be a non-motorized vehicle, such as a bike, a kickbike or roller-skates. The present invention is also applicable to trains, airplanes, helicopters, boats and other propelled vehicles travelling on the ground, water or in the air. Such applications are then implemented in a respective way which analogous to what is said herein below in relation to cars, bikes, etc.

A "driver", as used herein, is a person controlling the vehicle in question during the trip. Examples comprise the driver of a car or a bus, as well as a person cycling on a bike. In some embodiments, a "driver" may also be an autopilot or other human-assisted machine, or even a machine arranged to drive the vehicle completely independently. Such machine may be software- and/or hardware implemented, as suitable.

According to the invention, updated current-trip driving data sets are repeatedly read from the vehicle, in particular from a current vehicle.

Such reading can be performed by a piece of hardware equipment which is separate from the vehicle, such as a piece of equipment which is physically connected to, and communicates via, a hardware interface provided by the vehicle in question, such as a standardized hardware interface for connecting equipment for vehicle diagnosis or similar. This is illustrated in FIG. 1A, in which a piece of hardware 120 is physically connected to a hardware interface 101 of a vehicle 100 driven by a driver 110. The piece of hardware 120, which may for instance be a convention OBD (OnBoard Diagnostics) reader, communicates with a portable electronic device 130, such as a mobile phone, a PDA, a laptop computer or similar, using a wireless 121 or wired 122 communication channel.

The portable electronic device 130 may preferably be controlled, by the driver 110, and is preferably a general-purpose programmable computer device, such as a conventional smartphone, with wireless communication capabilities allowing it to communicate wirelessly with entities located outside of the vehicle 100, such as a base stations 140 of a mobile telephony network. Preferably, the mobile electronic device 130 comprises a SIM (Subscriber Identity Module) card 131 or corresponding functionality, using which the portable electronic device 130 identifies itself to such a mobile network. Preferably, the communication between the mobile electronic device 130 and the base station 140 is a digital connection, preferably an internet connection, such as using GPRS, 3G, LTE, 4G or 5G. Preferably, the wireless communication 121 between the mobile electronic device 130 and the piece of hardware 120 is a local communication, such as NFC, Bluetooth®, WiFi, or similar.

FIG. 1B illustrates an alternative setup, in which a portable electronic device is not required, but wherein the piece of hardware 120 itself comprises wireless communication functionality 123, such as GPRS, 3G, LTE or WiFi functionality, for communicating with the base station 140, or a similar entity. Preferably, such communication is based upon identification using a SIM card 124, or similar functionality, installed in the piece of hardware 120, and is preferably a digital communication, preferably an internet communication. However, the communication may also be through a local wireless or wired communication, such as a Bluetooth® or USB interface. In the latter case, communication between the vehicle 100 and the central server 150 will take place intermittently, such as the vehicle 100 loading up data to the central server 150 when parked, such as during charging and refueling.

FIG. 1C illustrates yet another alternative setup, in which the piece of hardware 120 is not required either. In this case, the vehicle 100 comprises a piece of hardware 102 having a communication 103 means arranged to carry out communications with the base station 140 as described above, preferably based upon identification using a SIM card 104, or similar functionality, installed in the vehicle 100. Preferably, the communication in this case is digital, preferably in the form of a wireless internet connection.

FIG. 1A further illustrates a central server 150, which is in contact with the base station 140, for instance via a mobile telephony operator, and for instance in addition via a conventional internet connection 170. Hence, the central server 150 and the portable electronic device 130 are arranged to communicate with each other, at least the portable electronic device 130 is arranged to, while arranged in the vehicle 100, provide information to the central server 150 using wireless communication. The corresponding is true regarding the piece of hardware 120 in FIG. 1B and the piece of hardware 102 in FIG. 1C, that are correspondingly arranged to provide information to the central server 150 using wireless communication from the vehicle 100.

Also in FIG. 1D, the central server 150 is present, together with the internet connection 170 and the base stations 140. However, in FIG. 1D, there is a server 160 arranged at or in the vehicle 100 also. Namely, FIG. 1D illustrates an alternative or supplementary embodiment, using such a local server 160 is arranged at or in the vehicle 100. In this case, depending on the practical embodiment as described in further detail herein below, the provision of information to the central server 150 from a corresponding wireless entity 102, 120, 130, as illustrated in FIGS. 1A, 1B, 1C, may or may not take place. Furthermore, a provision of corresponding information takes place to the local server 160, using a wired or wireless communication channel provided locally in the vehicle 100. In FIG. 1D, the local server 160 is illustrated as a standalone server, for exemplifying purposes. It is, however, realized that the local server 160 may be a software component comprised in the mobile electronic device 130. The local server 160 may also be comprised in any of pieces of hardware 102, 120, 130 or be in suitable wired or wireless communication with any of pieces of hardware 102, 120, 130. Moreover, the local server 160 is preferably arranged to communicate wirelessly with the central server 150, such as via the portable electronic device 130 and further via base stations 140 and the internet 170, or using a proprietary, preferably SIM card (or similar) identification based, communication functionality.

In a particularly preferred embodiment, the local server 160 is integrated in the hardware of the vehicle 100, in which case devices 120, 130 are not necessary, but the onboard-vehicle system functionality is completely self-contained in the vehicle. In that case, the local sever 160 may provide the driver of the vehicle 100 with trip performance parameter value feedback (see below) based upon driving data set data in the local database 161, but may only intermittently communicate with the central server 150.

It is realized that, in case a local server 160 is used, a respective such local server 160 may be arranged in several different vehicles. Hence, the system according to the present invention may comprise the central server 150 as well as a plurality of local servers 160.

In order for the system to know what vehicle is used, and/or which driver is driving what vehicle, during a particular observed trip, it is preferred that each driver and/or each vehicle has an account, such as a user account, on the server 150, which may be registered ahead of time in a way which is conventional as such. It is further preferred that the user account is tied to an authenticated session, such as a login session using the portable electronic device 130, the vehicle 100, or in another suitable way, so that the server 150 gains knowledge about what user of the system is currently driving the vehicle 100. In a corresponding manner, it is preferred that the vehicle 100 is automatically identified to the server 150, for instance by the vehicle 100 identifying itself automatically to the server 100 based upon a unique vehicle identity, or by the user selecting the current vehicle from a list of predefined vehicles for that user.

As mentioned above, the present invention relates to a method and a system for assessing the driving performance of a driver. This assessment is, in general, performed automatically by said system, and in particular by automatic calculations performed mainly in the central server 150 and/or in local servers 160. In the following, all calculations and determinations are performed automatically unless it is explicitly stated that they involve some type of manual interaction.

As used herein, the term "driving data set" is a set of parameter data observed during a particular trip. Preferably, the vehicle performing the trip is arranged to measure corresponding parameter data, using suitable hardware and/or software, substantially at the moment in time at which the driving data set is read from the vehicle, so that the driving data set substantially represents real-time, or at least near real-time, data regarding the trip in question, at the respective time or measurement. A "current-trip driving data set" is such a driving data set read from a current vehicle in relation to a current trip, preferably a current trip which is actually currently being undertaken when the reading in question is performed.

Furthermore according to the invention, the current-trip driving data sets each comprise data from at least a predetermined set of basic driving data parameters. Such parameters constitute measurable data regarding the progression of the trip in question, in this case the current trip, in particular such data which is measurable by the respective concerned vehicle itself. This will be exemplified below.

The basic parameter set preferably comprises at least 3, preferably at least 4, and preferably at the most 10, preferably at the most 7, different parameters.

Moreover, new such current-trip data sets are read from the vehicle in question at consecutive observation time points separated by at the most a predetermined observation time period. Preferably, the read updated current-trip data sets are immediately or at least substantially immediately, upon reading, communicated to the central server 150 and/or, depending on the embodiment currently performed, to a local server 160, as the case may be, and using the above described wired and/or wireless communication links. It is understood that the current-trip data sets are read by the vehicle 100 and made available via interface(s) 101, 103, 121, 122 and/or 123.

The current-trip driving data sets are hence collected for, and preferably during, a current trip, and are furthermore stored, at least in aggregate form, in the central server 150 and/or in the local server 160 for future reference. For this and other purposes, the central server 150 and the local server 160 comprise a respective database 151, 161, for digital storage of read driving data sets.

Hence, preferably, parameter values of said basic parameter set are automatically captured by the vehicle 100 and communicated to the portable electronic device 130 arranged at the vehicle 100, which portable electronic device 130 then communicates, via a wireless link 121, 140, said driving data sets to the central server 150. Alternatively, the parameter values are communicated, via a wireless link 103, 121, 123 directly from the vehicle 100 to the central server 150.

Figure 2:
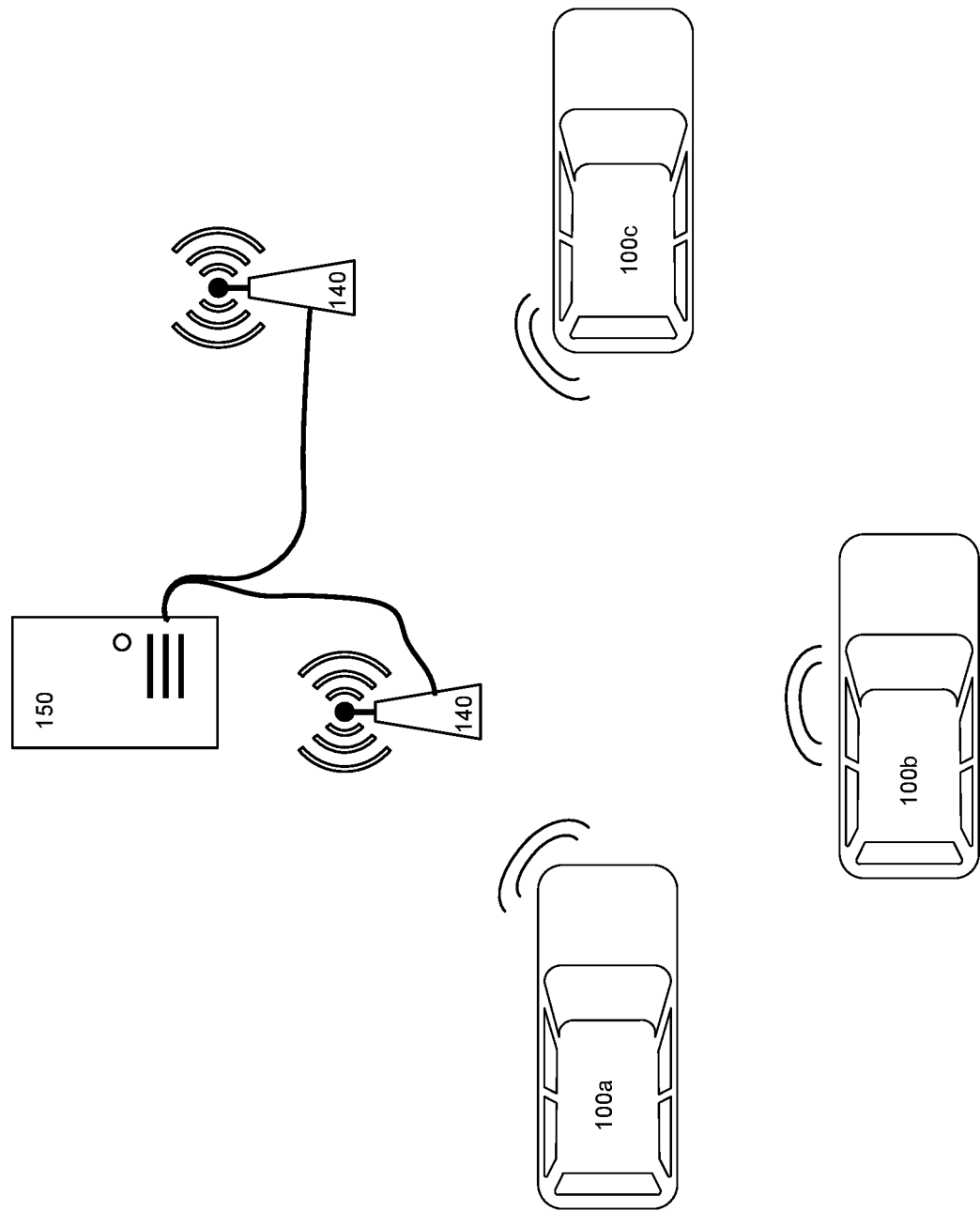
FIG. 2 is an overview illustration of a system according to the present invention, arranged to perform a method according to the present invention.

FIG. 2 illustrates three vehicles 100a, 100b, 100c, of which one may be a current vehicle, and of which each may be as illustrated in FIGS. 1A-1D. Each of the vehicles communicates with the central server 150 as described above.

First Aspect

Figure 3:
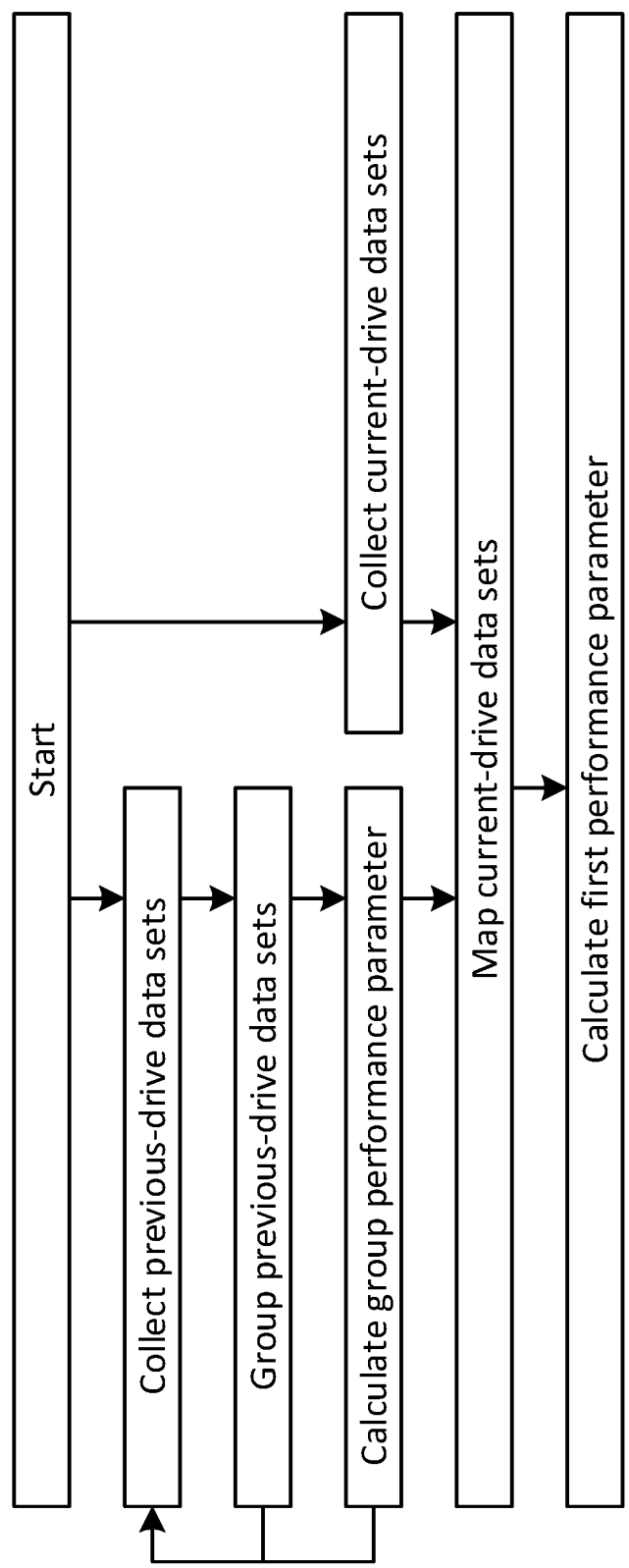
FIG. 3 is a flowchart illustrating a method according to the present invention.

According to an exemplifying embodiment the present invention, illustrated in FIG. 3 in the form of a flow chart, in a first method step the method is started.

In a subsequent method step, previous-trip driving data sets are collected.

As used herein, the term "previous trip" is a trip which was performed, by a certain vehicle, a "previous vehicle", at least partly before a current trip is conducted, or at least a trip for which driving data sets are available to the central server 150 before the current-trip driving data sets are collected for analysis. In particular, at least one data set read in relation to and during a previous trip is read before at least one current-trip driving data set is read.

Correspondingly, a "previous-trip driving data set" is a data set of the type discussed above, read from a vehicle performing a previous trip. It is realized that a driving data set read by a current vehicle can constitute a previous-trip driving data set for another current vehicle, at a later point in time, or even for the same vehicle, which at that later point in time is a current vehicle.

Such collected previous-trip driving data sets are observed at a plurality of different observation time points, for a plurality of different previous trips made by a plurality of different drivers and a plurality of different vehicles. In particular, it is preferred that said previous-trip driving data sets are observed at least 1 000, more preferably at least 10 000, more preferably at least 100 000, different observation time points, and/or for at least 100, more preferably at least 1 000, more preferably at least 10 000 previous trips, and/or made by at least 5, preferably at least 50, more preferably at least 100, different drivers and/or at least 5, preferably at least 50, more preferably at least 100, more preferably at least 1 000, different vehicles.

In other words, the previous-trip driving data sets collected preferably constitute a large amount of data regarding different trips, drivers and/or vehicles.

The collecting of the previous-trip driving data sets may take place by the vehicle 100a, 100b, 100c in question, as described above with respect to the collecting of current-trip driving data sets, which collecting comprises reading by the vehicle in question, communicating to the central server 150 and/or a local (arranged in the vehicle in question) server 160, and subsequent storage therein. In case a local server 160 is used, the stored information is subsequently provided to the central server 150, using a suitable communication method, such as wirelessly via base stations 140, intermittently or after the previous trip is finished. Hence, the central server 150 will eventually receive and centrally store, in database 151, a number of previous-trip driving data sets for each previous trip conducted using the method and system according to the present invention.

Each of said previous-trip driving data sets comprises respective parameter values for at least a certain predetermined set of qualified driving data parameters. Such parameters constitute, similarly to the above mentioned basic driving data parameters, measurable data regarding the progression of the trip in question, in this case the previous trip.

The qualified driving data parameter set comprises the basic parameter set, which basic set is hence a subset of said qualified set. The basic and qualified sets may also be identical. In particular, the qualified driving data parameter set comprises instantaneous vehicle energy consumption. Preferably, however, the basic driving data parameter set, as opposed to the qualified driving data parameter set, does not comprise instantaneous vehicle energy consumption.

Said instantaneous vehicle energy consumption may be, for instance, instantaneous fuel consumption or instantaneous power use of a battery used to propel the vehicle in question. Preferably, the instantaneous vehicle energy consumption is measured and expressed in relation to traveled distance, such as "litres per km" or "Wh per km", or the corresponding, even though in other embodiments they could also be expressed in relation to time, such as "litres per hour".

The above-described collecting of current-trip driving data sets may be performed in parallel to the collecting of previous-trip data sets, or afterwards.

In a subsequent method step, which may be performed in parallel to the collecting of previous-trip driving data sets, the collected previous-trip driving data sets are grouped, or classified, into basic historic groups of such sets. Preferably, each previous-trip data set is classified into at the most one, preferably exactly one, of said basic historic groups. In this classification, the historic groups hence constitute the classes into which the driving data sets are classified. It is noted that these "classes" are not the same as the vehicle classes described below.

Preferably, the grouping is based upon a basic driving data set similarity measure, in other words a comparison measure for comparing driving data sets comprising said basic parameter set, and determining a similarity between such compared data sets. Preferably, the basic driving data set similarity measure is also arranged to compare qualified driving data sets one to each other, or even to compare basic driving data sets to qualified driving data sets, based upon the values of said basic parameters comprised in such data sets. However, it is preferred that the basic driving data set similarity measure does not take instantaneous energy consumption data in said driving data sets into consideration for the calculated similarity measure. Further preferably, the same basic driving data set similarity measure is used for all similarity calculations between driving data sets as described herein.

"Similarity", as used herein with respect to two driving data sets, refers to numerical similarity of the respective parameter values of the driving data sets in question.

Hence, after such classification in this method step, a number of basic historic groups will exist, each comprising zero or more previous-trip driving data sets that are sufficiently similar one to the other according to the similarity measure. It is also possible that the classification is performed continuously, so that newly collected previous-trip driving data sets are classified into one of said basic historic groups in connection to their collecting, or intermittently. In this case, the contents of said basic historic groups will be dynamically updated as time goes by.

In practise, each previous-trip driving data set may not be individually stored in the database 151. Instead, the previous-trip driving data sets for each particular basic historic group are preferably stored in an aggregated manner in the database 151. This may, for instance, be achieved by the definition of each basic historic group being associated, in the database 151, with corresponding aggregate data calculated based upon the previous-trip driving data sets being mapped to the basic historic group in question. Such aggregate data may comprise, for instance, a group performance parameter value (see below).

In a subsequent method step, for each of said current-trip driving data sets collected as described above, the current-trip driving data set in question is mapped to at the most one particular of the above-described basic historic groups, hence the same set of basic historic groups used for classification of the previous-trip driving data sets.

This mapping, of the current-trip driving data sets to said basic historic groups, is based upon a basic group conformity measure between a driving data set and a basic historic group. Even though the conformity measure is a measure of conformity between a data set and a group, in other words how closely the data set in question conforms to the group in question, whereas the above discussed similarity measure is a measure of similarity between one data set and another data set, the conformity measure can be similar to the similarity measure, or even analogous in the sense that the requirements for two data sets to be classified into one and the same particular group are the same as the requirements for a certain data set to be classified into the group in question. In particular, it is preferred that both the conformity measure and the similarity measure is based upon a basic historic group definition, so that "conformity" between a data set and a group means that the data set falls under the definition of the group, whereas "similarity" between two data sets means that both data sets fall under the definition of one and the same group (regardless which such group). This will make possible a calculationally simple implementation, resulting in a high performance system.

According to a particularly preferred embodiment, the basic driving data set similarity measure is arranged to classify driving data sets into one of a plurality of different predetermined basic historic groups based upon conformance of the respective basic parameter values comprised in the driving data set in question to respective allowed parameter value ranges for each of said parameters. In particular, for each parameter in said basic set of parameters and for each basic group, a predefined respective parameter value range is defined. Then, the basic group is defined in terms of a combination of one such parameter value range for each parameter in the basic set of parameters. It is noted that not all parameters in said basic set of parameters necessarily have to be used, in other words one or several parameters can have very large allowed intervals. Preferably, at least two, more preferably at least three, parameters in the basic set of parameters are associated with consecutive, non-overlapping intervals, and that different groups are defined by unique combinations of such mutually non-overlapping intervals of parameter values. It is preferred that, for each such parameter, there are at least ten, preferably at least fifty, such non-overlapping intervals.

It is realized that other similarity measures can also be used, such as some type of geometric distance measure based upon the numerical values of the parameter values in each data sets, in this case viewed as a vector of values.

In a manner corresponding to the above described, with respect to the similarity measure, the basic group conformity measure is arranged to classify driving data sets into one of said plurality of different predetermined basic historic groups based upon conformance of the respective basic parameter values comprised in the driving data set in question to respective allowed parameter value ranges for each of said parameters. Preferably, the intervals used to define the basic conformity measure are the same intervals used to define the basic similarity measure.

It is preferred that the conformity measure is based upon the numerical parameter values of the current-trip driving data set in question and upon a definition of the basic historic group in question.

In subsequent method steps, a first energy consumption-based trip performance parameter value is calculated for the current trip.

Preferably, the first energy consumption-based trip performance parameter is calculated based upon a respective energy consumption-based group performance parameter value for each of the basic historic groups to which at least one current-trip driving data set was mapped as described above. Hence, in a first of said subsequent method steps, or beforehand, such a group performance parameter value is calculated for at least each such mapped basic historic groups.

It is realized that both the above-described grouping of previous-trip driving data sets into basic historic groups; mapping of current-trip data sets to said groups; and/or calculation of said group performance parameter values can be performed on the fly, continuously as new data becomes available. It is preferred that the group performance parameter value always takes into consideration all previous-trip driving data sets available to the entity performing the calculation, however not that the current-trip driving data set values are used as previous-trip driving data sets before the current trip is finished. Upon finishing, the current trip may become a previous trip for a subsequent current trip, of the same or another vehicle and/or user.

For each mapped basic historic group, the group performance parameter value is calculated based upon the respective instantaneous energy consumption value in the respective previous-trip driving data sets classified into, and therefore comprised in, the basic historic group in question. It is noted that the previous-trip driving data sets, each comprising said qualified parameter set, comprise such a respective instantaneous energy consumption value.

Using such a method and such a system, driving-related data from many different previous trips, partaken using many different vehicles and by many different drivers, can be used to automatically assess the driving performance of a current trip in a way which does not require any detailed assumptions of the conditions under which the data was collected. In particular, it is possible to obtain a surprisingly accurate view on the performance of the driver, in terms of driving energy consumption, under very shifting external conditions, in terms of for instance vehicle load, road and weather conditions. Furthermore, it is possible to compare the obtained energy consumption performance across different drivers and also across different types of vehicles.

Furthermore, it is possible to achieve these advantages even without any a priori information regarding neither geography, nor road or traffic conditions. Hence, no expensive measurements are necessary; instead, all drivers using the system create a common set of data as they use the system, irrespectively of the details describing the external environment in which they perform when doing so.

All these advantages are achievable automatically, without any manual intervention and simply by using the system. This will be explained in further detail below.

In the embodiment described above, this is possible by the use of the above-explained basic historic groups, that are used to disconnect the identity of the previous trips from the previous-trip driving data sets observed during the previous trip in question, and that allow using the information content in the data sets irrespectively of the other properties of each previous trip. In particular, this can be achieved in various different aspects, using various detailed techniques as will be described in the following. In some of these aspects, it is not vitally important to use basic historic groups, as will become clear.

In particular, the present inventor has discovered that, by fragmenting a large number of previous trips into small segments, where each segment is so small so that essentially no qualitative information can be derived about the driving from such individual segment, and then mapping the segments of a current trip to such historically collected segments, very accurate information can be derived, in the aggregate, about the current trip.

It is preferred that the calculations described herein are performed using and based upon all, or substantially all, available data from all trips performed by all vehicles that are connected to the system. In this case, the calculations must be performed by an entity having access, in aggregate or detailed form, to all such data. It is preferred that this entity is the central server 150, which then receives previous-trip and current-trip driving data sets from all connected vehicles, either continuously or intermittently, or differently for different connected vehicles, and performs the calculations described above. It is also possible that the local server 160 receives the previous-trip driving data sets, or corresponding data in aggregate format, such as basic historic group definitions together with calculated, preferably updated, respective group performance parameter values, from the central server 150, and then performs the actual calculation of the first performance parameter for the current trip performed by the current vehicle in which the local server 160 is arranged. In this case, updated data can be provided to the local server 160 only intermittently, such as before each current trip, once a day or even once a week, allowing the advantages of the present invention to be achieved even when there is no reliable internet connection available to the current vehicle, or when driving abroad without any roaming-based wireless internet connection. The data may even be provided to the local server 160 only once, such as in connection to an installation of a piece of local server 160 software.

According to a preferred embodiment, the first group performance parameter is a relative instantaneous energy consumption value for the respective previous-trip driving data sets in the basic historic group in question. In particular, it is preferred that this relative value is calculated in relation to a respective total energy consumption for the complete previous trip during which the previous-trip driving data set in question was observed, such as a total petrol, diesel, gas or electricity consumption or a total average petrol, diesel, gas or electricity consumption per km of the whole previous trip. In this case, both instantaneous energy consumption data, as well as total energy consumption for a whole trip, are available from the previous vehicle in question, for reading and submission to the central server 150.

Figure 4:
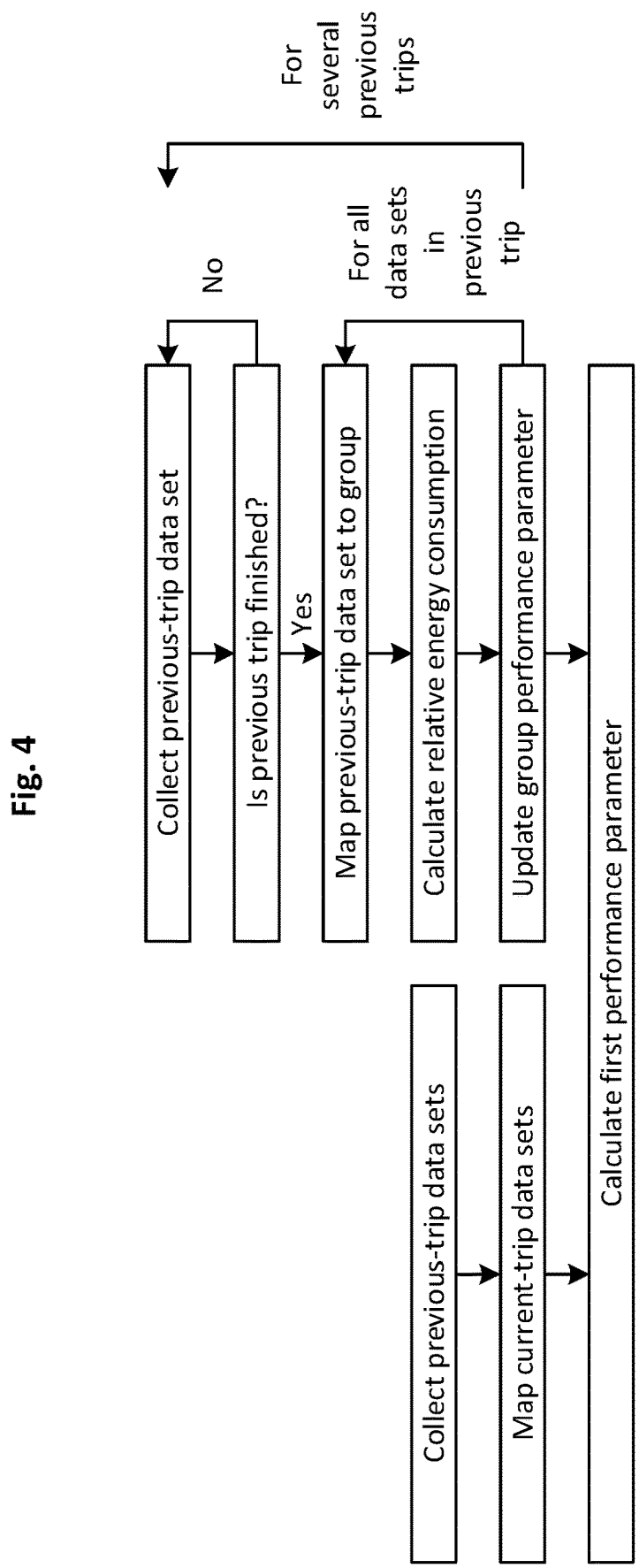
FIG. 4 is a flowchart also illustrating a method according to the invention.

FIG. 4 illustrates how this relative instantaneous energy consumption based group performance parameter can be calculated.

In a first method step, previous-trip driving data sets are collected for a particular previous trip. Once all previous-trip driving data sets have been collected for the previous trip in question, the total energy consumption for the entire previous trip is also available from the previous vehicle, for reading and collecting as described above.

Then, for each such collected previous-trip data set for sail previous trip, a corresponding basic group is identified, and the relative instantaneous energy consumption value for the data set in question is calculated, for instance by dividing the instantaneous energy consumption value for the data set in question with the total energy consumption for the entire previous trip in question.

Then, the group performance parameter for the basic historic group is updated using the corresponding previous-trip driving data set basic parameter values. This may, for instance, be performed so that the group performance parameter value is always an average value of the respective calculated relative instantaneous energy consumption values for each previous trip data set that has, up to that point in time, been allotted to the basic group in question. For instance, this may be performed by, for each basic historic group, keep track of the number of previous-trip driving data sets that have been allotted to the group in question, and to perform a suitable weighted average calculation when updating the relative energy consumption value for the group.

In parallel to the constantly ongoing collecting and evaluating of previous trips and their respective data sets, as well as relative instantaneous relative energy consumptions for various allotted basic historic groups, current-trip driving data sets are collected as described above. Once the first performance parameter value is to be calculated, the collected current-trip driving data sets are mapped to respective basic groups, as also described above, and the first performance parameter is then calculated based upon the calculated group performance parameters. This may, for instance, take place by calculating an average value of the respective group performance values for all mapped groups for the current trip. Such average value may be a simple geometrical average, or, preferably, a weighted average in which the respective group performance values of more frequently updated (by previous trip data sets being allotted thereto) basic groups are given more weight than respective group performance values of less frequently updated basic groups. In case not all current-trip driving data sets correspond to a respective existing basic historic group, the averaging function may ignore those current-trip driving data sets for the purpose of calculating the first performance parameter value.

Hence, in this preferred example, the first trip performance parameter is calculated based upon an average value of the respective relative instantaneous energy consumption values for the respective basic historic groups to which respective current trip driving data sets of the current trip have been mapped. The relative instantaneous energy consumption value, in turn, for each basic historic group in question, is calculated based upon an average of the respective relative instantaneous energy consumption values for each previous-trip data set allotted to the basic historic group in question, as measured in relation to a corresponding previous trip during which the data set in question was observed.

The method according to the present invention can be made completely automatic, collecting driving data sets for all trips performed by all vehicles connected to the system according to the present invention. However, in order to increase data quality and decrease adverse effects due to data noise, it is preferred that only a subset of said vehicles are marked as trusted by the system. In this case, the above described group performance parameter values are calculated so that they are not affected by instantaneous energy consumptions reported by vehicles not marked as trusted. For such non-trusted vehicles, driving data sets may be still be collected, but such collected driving data sets do not affect the group performance parameters for the various basic historic groups to which the driving data sets are allotted as described above. Also, non-trusted vehicles may constitute current vehicles, and current-trip performance parameter values may be calculated for such non-trusted vehicles. Which vehicles that are to be trusted may, for instance, be manually selected based upon knowledge about data quality available from particular vehicles and possibly also for particular drivers; automatically selected based upon data availability for a predetermined minimum data type set for vehicles; or in any other way.

Preferably, the predetermined observation time period mentioned above is relative short, so that each current trip would typically result in a large plurality of different current trip driving data sets. Preferably, the predetermined observation time period is at the most 10 seconds, preferably at the most 5 seconds, more preferably at the most 2 seconds, more preferably between 0.2 and 2 seconds, most preferably about 1 second. Using such short time intervals strikes a good balance between collecting as much relevant data as possible while not giving rise to unnecessarily large amounts of data to communicate, store and process.

In particular, it is preferred that the current trip driving data sets are read at regular time intervals, so that the time period between two consecutive readings is substantially the same for all pairs of such consecutive readings.

The reading as such may be an instantaneous readout or an average value read across a averaging certain time period, which is preferably at the most 5 seconds of length, preferably at the most 2 seconds of length.

It is noted, firstly, that the collecting of the data sets may be performed more intermittently, and also at a certain delay, as long as the reading of driving data sets are performed regularly. Secondly, the data set reading frequency may or may not be different from the sampling time period length for each read data set. For instance, if readings take place every 1 seconds, each reading may relate to vehicle parameter data covering a respective historical time period of 5 seconds running up to the currently read second. Such prolonged sampling time period may be achieved by the vehicle 100 itself, but preferably software and/or hardware implemented logic performing such prolonged sampling is comprised in either of devices 120, 130, or alternatively in the central server 150 or even in the local server 160. In the latter case, the sampling may in practise take place by either device 120, 130, 150, 160 receiving repeated instantaneous readings, and performing prolonged sampling readings artificially by performing calculations based upon such repeated readings.

Correspondingly, the same is preferred as concerns previous-trip driving data sets. Preferably, current-trip and previous-trip driving data sets are read in substantially the same way, using the same observation time periods.

Second Aspect

According to one aspect of the present invention, the above discussed basic parameter set comprises instantaneous vehicle velocity, instantaneous vehicle engine rotation speed, instantaneous vehicle velocity change as well as instantaneous vehicle engine rotation speed change. It is then preferred that all these parameter values, for each data set in question, are used for calculating said basic group conformity measure, preferably as well as said basic similarity measure. The instantaneous vehicle velocity and instantaneous vehicle engine rotation speed are preferably measured on the engine of the vehicle, and preferably by the vehicle itself, as opposed to being measured using a system which is not connected to the engine of the vehicle, such as using a GPS-enabled measurement device or similar. GPS-based measurements are hence preferably not used in this context, but only for producing the below-described extended driving data sets. Said velocity change and engine speed change are also, in a similar manner, either measured on the engine or calculated based upon said instantaneous velocity and engine speed values measured on the engine. Herein, the expression "measured on the engine" encompasses also other measurements performed directly on the vehicle hardware as such, for instance measurements performed on wheels or wheel axes of the vehicle.

Herein, for wheeled vehicles using an explosion motor for propelling of the vehicles, the relationship between instantaneous vehicle velocity and instantaneous engine rotation speed, and in applicable cases the respective absolute values of these two parameters and also their respective changes over time, have proven to be very useful to consider for the present purposes. However, for electrically propelled wheeled vehicles, it is, as an alternative, possible to instead of instantaneous vehicle speed use instantaneous energy consumption, such as instantaneous electrical power usage of the electrical motor propelling the vehicle, as provided by a battery in the vehicle. For the same electrical vehicles, instantaneous motor load should then be used instead of instantaneous motor rotation speed. Correspondingly, and as applicable, instantaneous energy consumption change and instantaneous motor load change should then be used instead of instantaneous vehicle speed change and instantaneous engine rotation speed change. Of course, for some vehicle types comprising both an explosion engine and an electrical motor, both these options can be used at the same time. In particular, and especially for electrically propelled vehicles, it is preferred that the basic parameter set comprises, in addition to said instantaneous energy consumption, instantaneous energy consumption change, instantaneous motor load and instantaneous motor load change, also use instantaneous vehicle velocity, and preferably also instantaneous vehicle velocity change. The latter two can be as described above. It is noted that, for all these values, they are preferably measured on the vehicle as described above.

Herein, whenever instantaneous vehicle speed and instantaneous engine rotation speed, or the corresponding change measures, are used for some purpose, it is in general the case that, instead or in addition to these values, as applicable, instantaneous motor load and instantaneous energy consumption may be used correspondingly. This applies both to the present aspect, the below described class-defining parameters and elsewhere in this description.

The present inventor has discovered that it is sufficient to use these four basic parameters in order to achieve very reliable data in terms of the current-drive performance parameter. In particular, this is true in case very many previous-trip driving data sets are used for many different vehicles and/or many different drivers, as quantified above.

Since the current instantaneous vehicle velocity, as well as the current instantaneous engine rotation speed, are typically available for readout from the vehicle, they can be readily collected. The vehicle velocity change and the engine speed change can be readily calculated based upon the read values, such as by a software and/or hardware implemented logic in any of devices 120, 130, 150 or 160.

Even more preferably, no other data values, apart from the data values regarding instantaneous velocity, instantaneous engine rotation speed, as instantaneous velocity change and instantaneous engine rotation speed change, are used by said basic group conformity measure, and preferably the corresponding is also true for said basic similarity measure. This provides for a particularly simple data collecting and performance parameter calculation process, which still is able to provide a high quality output.

According to a preferred embodiment, the instantaneous velocity change is measured over a certain velocity change time period, so that the velocity change is measured as a velocity difference between two points in time separated by said time period.

Correspondingly, the instantaneous engine rotation speed change is preferably measured over a certain speed change time period, and hence measured as a difference in instantaneous engine speed between two points in time separated by said time period.

In particular, it is preferred that the length of the velocity change time period is different from the length of the speed change time period, while, for each previous-trip driving data set the corresponding velocity change time period and the corresponding speed change time period are overlapping. Preferably, the point in time at which the instantaneous vehicle velocity is measured and the point in time at which the instantaneous engine speed is measured are both, independently of each other, contained in both said overlapping change time periods, and preferably measured at the same or substantially the same time. Such overlapping and containing guarantees that the measured parameters of each driving data set are related to one and the same driving situation, which is important even for very frequently measured driving data sets.

Moreover, the instantaneous vehicle velocity change time period and said instantaneous engine speed change time period are of different lengths. Namely, in many applications it is necessary to fine-tune each of said change time periods to capture relevant data regarding the trip in question, and in general the optimal change time periods will not be the same for different parameters. For instance, it is in general preferred that the engine velocity change time period is shorter, such as at least twice as short, as the vehicle velocity change time period. This is not only due to the fact that engine velocity can change quicker during driving than vehicle velocity, but also since the use of such shorter change time period results in the capability of the system to more accurately capture certain driver behaviour in certain situations while driving.

Even in case the velocity time period and the speed time periods have different lengths, it is preferred that, for each observation time point and hence for each driving data set, they share the same starting time point, or, alternatively the same ending time point.

Furthermore, it is preferred that at least one of said velocity change time period and said speed change time periods have a length which is longer than the above discussed predetermined time period (the time period between each consecutive observation time point).

Both the velocity change time period and the engine speed change time period may have an end point at the corresponding observation time period, and hence correspond to a measurement conducted in the historical time period running up to the measurement time of the instantaneous vehicle velocity and the engine speed. However, it is preferred that the vehicle velocity change time period runs from the observation time point of said instantaneous vehicle velocity and forwards, and/or that that the engine speed change time period runs from the observation time point of said instantaneous engine rotation speed forwards. This results in that each driving data set comprises information regarding the current situation in terms of instantaneous velocity and engine speed, as well as how that situation is changed during the coming time period. The present inventor has discovered that this provides very useful performance parameter values for the purposes discussed below.

In case the observation time period is up to about 2 seconds, it is particularly preferred that the vehicle velocity change time period for each observation time point starts at the instantaneous vehicle velocity observation time point and runs forwards, between 3 and 10 seconds, and that the engine speed change time period for each observation time point starts at the instantaneous engine speed observation time point and runs forwards, between 1 and 5 seconds.

Figure 5:
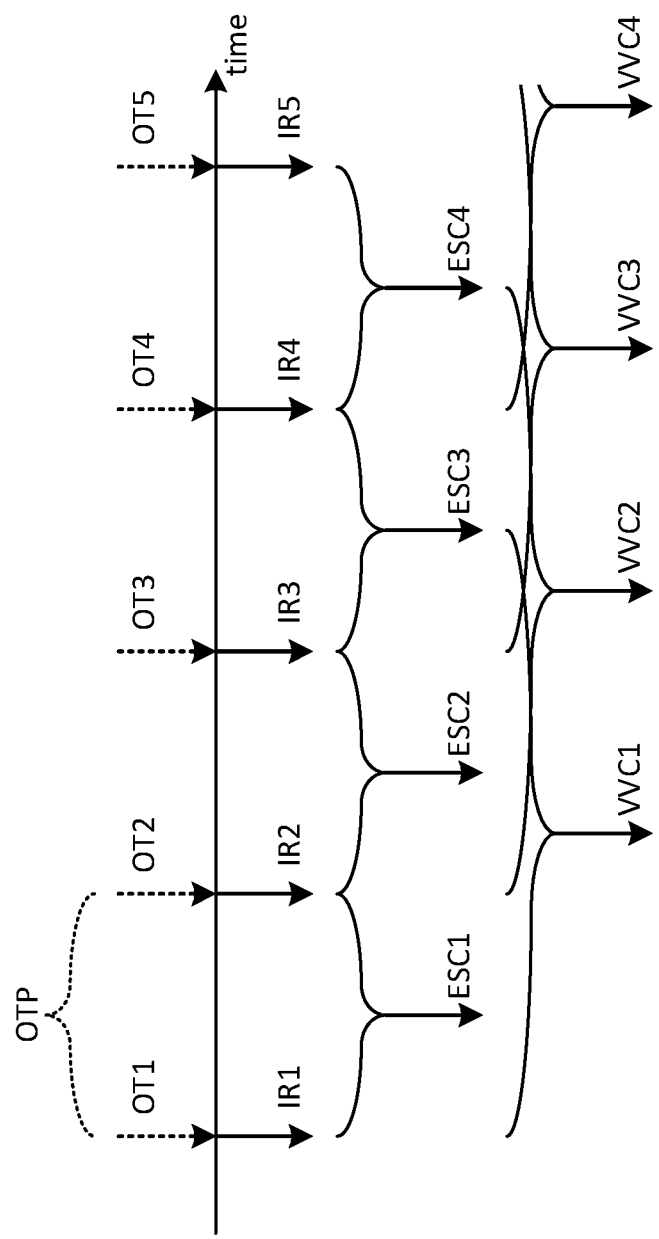
FIG. 5 illustrates a measurement scheme according to the present invention.

FIG. 5 illustrates an exemplifying measurement scheme for use with a vehicle and the system according to the present invention. Along the time axis, a number of consecutive observation time points OT1, [ . . . ], OT5 are shown, each separated by an observation time period OTP of fixed length.

For each observation time point, the following readings are made from the vehicle:

Instantaneous readings (IR1, [ . . . ], IR5]) regarding instantaneous vehicle velocity, instantaneous engine speed, and any other instantaneously measured values.

Engine speed change (ESC1, [ . . . ], ESC4). This parameter is measured forward, across a time period which is identical to the observation time period OTP. Hence, the engine speed change value for observation time point PT1 will not be available until observation time point OT2, and can then be collected as described above.

Vehicle velocity speed change (VVC1, [ . . . ], VVC4). This parameter is measured forward, across a time period which is longer than the observation time period OTP. Hence, as seen in FIG. 5, the vehicle velocity speed change value for observation time point OT1 will not be available until sometime between observation time point OT3 and observation time point OT4, and can then be collected as described above.

Preferably, each driving data set is not collected and used to update a respective basic historic group, as described above, until all parameter values are available for the driving data set in question.

Apart from instantaneous vehicle velocity and engine speed, and vehicle velocity- and engine speed change, other parameters may also be measured, and may also belong to said basic parameter set. Such parameters comprise instantaneous break (either binary on/off or a break force value); instantaneous altitude; altitude change; instantaneous GPS location, altitude or heading, and/or GPS altitude or heading change, and/or GPS altitude acceleration; GPS-coordinate based vehicle velocity and/or acceleration; instantaneous engine oil temperature; gear number used; vehicle blinkers activated; outdoors temperature; status of cruise control systems; and/or any other data which is available either from the vehicle 100 itself or from the mobile device 130 and sensors arranged therein, preferably data that in some respect quantifies the position, behaviour and/or internal state of the vehicle.

In particular, it is preferred that break information, at least in the form of a binary signal (break activated/not activated) is part of said basic parameter set, and is hence also read from the vehicle at each observation time point.

Correspondingly, the basic similarity and/or conformance measures can take into consideration additional parameters of the exemplified types, using the corresponding approach as described above. For instance, in case break information is used in said measure, the binary break value (on/off) may be one of the defining parameters of said basic historic groups, and two driving data sets may be allotted to different basic historic groups in case the driving data sets are identical apart from a difference in break parameter value.

As described above, there is a communication from the current vehicle 100 to the central server 150, comprising current-trip driving data sets. In addition thereto, according to a preferred embodiment, the current-trip performance parameter value is calculated, preferably as described above by the central server 150, and thereafter communicated, via the above described wireless link, from the central server 150 to the current vehicle 100, such as to the portable electronic device 130 arranged at the current vehicle 100, and presented to the current driver. This presentation will be exemplified below.

Such calculation, together with possible communication and presentation to the current driver, may be performed in connection to a current trip being completed. However, according to a preferred embodiment a value of the above described current-trip performance parameter is calculated repeatedly, preferably at least every 10 minutes, more preferably at least every 2 minutes, more preferably at least every 30 seconds, during the current trip. Then, it is preferred that, for the purposes of calculating the current-trip performance parameter value, the current trip is considered to be that part of the current trip which has taken place, and has been collected, up to the moment at which the value of the current-trip performance parameter is calculated. Hence, the performance parameter value is calculated as if the collected current-trip driving data sets up to the point of calculation of the performance parameter value constitute data of the entire, completed current trip. In this case, it is preferred that the currently calculated such performance parameter value is communicated to the current vehicle and presented to the driver upon each such calculation. This way, the current driver can be provided with regularly updated information regarding the performance of the current trip, which makes it possible for the current driver to adjust his or her driving style in response to such information fed back from the system according to the present invention.

In case the current vehicle lacks an active internet connection, the collected current-trip driving data sets may be stored locally in the vehicle during the trip, for subsequent upload to the server 150 once an internet connection is again available. Then, the performance parameter value can be calculated and provided to the user in connection to this later point in time.

Third Aspect

Figure 12:
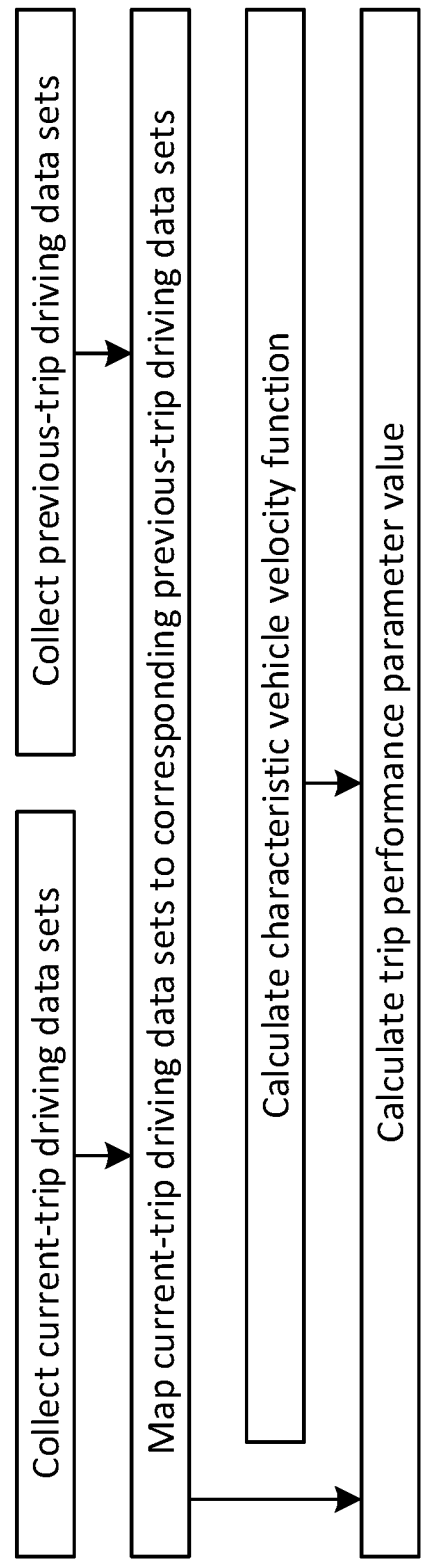

In one aspect of the present invention, illustrated in FIG. 12, a respective instantaneous relative vehicle energy consumption value is calculated for a plurality of the previous-trip data sets as described above. In particular, throughout the description of this aspect, this relative energy consumption is relative to a total energy consumption for a respective trip during which the previous-trip data set in question was observed.

Hence, in a first step, previous-trip and current-trip driving data sets are collected, and the collected current-trip driving data sets are each mapped to respective previous-trip driving data sets in a suitable way, such as using the basic similarity measure, and/or using basic historic groups and the basic conformance measure, as described above.

In a second step, which may be performed at any time before a third step, and in particular before, during or after the first step, a characteristic relative vehicle energy consumption function, regarding the value of said instantaneous relative vehicle energy consumption for different instantaneous vehicle velocity parameter values, is calculated. This characteristic function is preferably calculated based upon available previous-trip driving data sets for previous vehicles as explained below. Preferably, there is maximally one such characteristic function for each of the below described vehicle classes, and it is preferred that each characteristic function is updated automatically as new previous-trip driving data sets become available, or at least intermittently based upon newly available data. This way, an automatic compensatory mechanism is accomplished without adding more than limited calculation overhead to the method.

The characteristic vehicle relative energy consumption function is preferably not calculated only based upon data observed for one vehicle, such as the current vehicle. Instead, it is preferably calculated based upon data observed for a plurality of previous vehicles. The characteristic function may be calculated taking into consideration previous-trip driving data sets for substantially all, or at least a plurality of, the vehicles in the same vehicle class as the one to which the current vehicle is mapped and to no other vehicles; alternatively it may be calculated based on previous-trip driving data sets for substantially all, or at least a plurality, of all the previous vehicles regardless of vehicle class.

In said third step, the value of a trip performance parameter, such as the above first or second trip performance parameter, is calculated, for instance as described above. In particular, the performance parameter is calculated based upon an average value of the respective relative instantaneous energy consumptions for previous-trip data sets that correspond to each of said current-trip data sets based upon a similarity or conformance measure regarding the respective values of said basic parameters.

In case classes are used (see below), the current vehicle is hence first classified into a particular current class of the below described set of classes based upon said class conformity measure, and the trip performance parameter value is then calculated based upon only the respective relative instantaneous vehicle energy consumption values for previous-trip data sets in the current collection, corresponding to the current class as defined below.

According to the present aspect of the invention, however, the average is a weighted average wherein the weighting is performed using said characteristic vehicle relative energy consumption function.

Namely, the characteristic vehicle relative energy consumption function describes a characteristic relationship between instantaneous velocity and instantaneous relative energy consumption for previous vehicles. In other words, for each of a plurality of instantaneous velocity values or intervals, the characteristic function provides a value of a characteristic or typical relative energy consumption value for the vehicle velocity in question, where each such relative energy consumption value is a relative energy consumption for previous-trip driving data sets describing the instantaneous vehicle velocity and in relation to a total energy consumption during the complete trip during which such a previous-trip driving data set was observed.

When using this characteristic function in order to perform a weighted average calculation with respect to the relative energy consumptions of each previous-trip driving data set corresponding to each of the current-trip driving data set, the result is that systematic artefacts related to relative energy consumption for different vehicle velocities are automatically corrected for, and the reliability of the resulting trip performance value is increased as a result. Examples of possible systematic artefacts comprise systematically high relative energy consumption values at low velocities, due to internal engine friction, as well as systematically high relative energy consumption values at high velocities, due to air friction. However, other artefacts may also occur, such as artefacts only occurring in particular vehicle classes and so forth.

Preferably, the characteristic vehicle relative energy consumption function is normalized, so that its mean value, for all occurring vehicle velocity values or intervals, is 1. This type of curve, which is exemplified in FIGS. 13A and 13B, provides for a simple weighted average calculation, in which a simple multiplication with the characteristic vehicle relative energy consumption function is often sufficient.

Figure 13A:
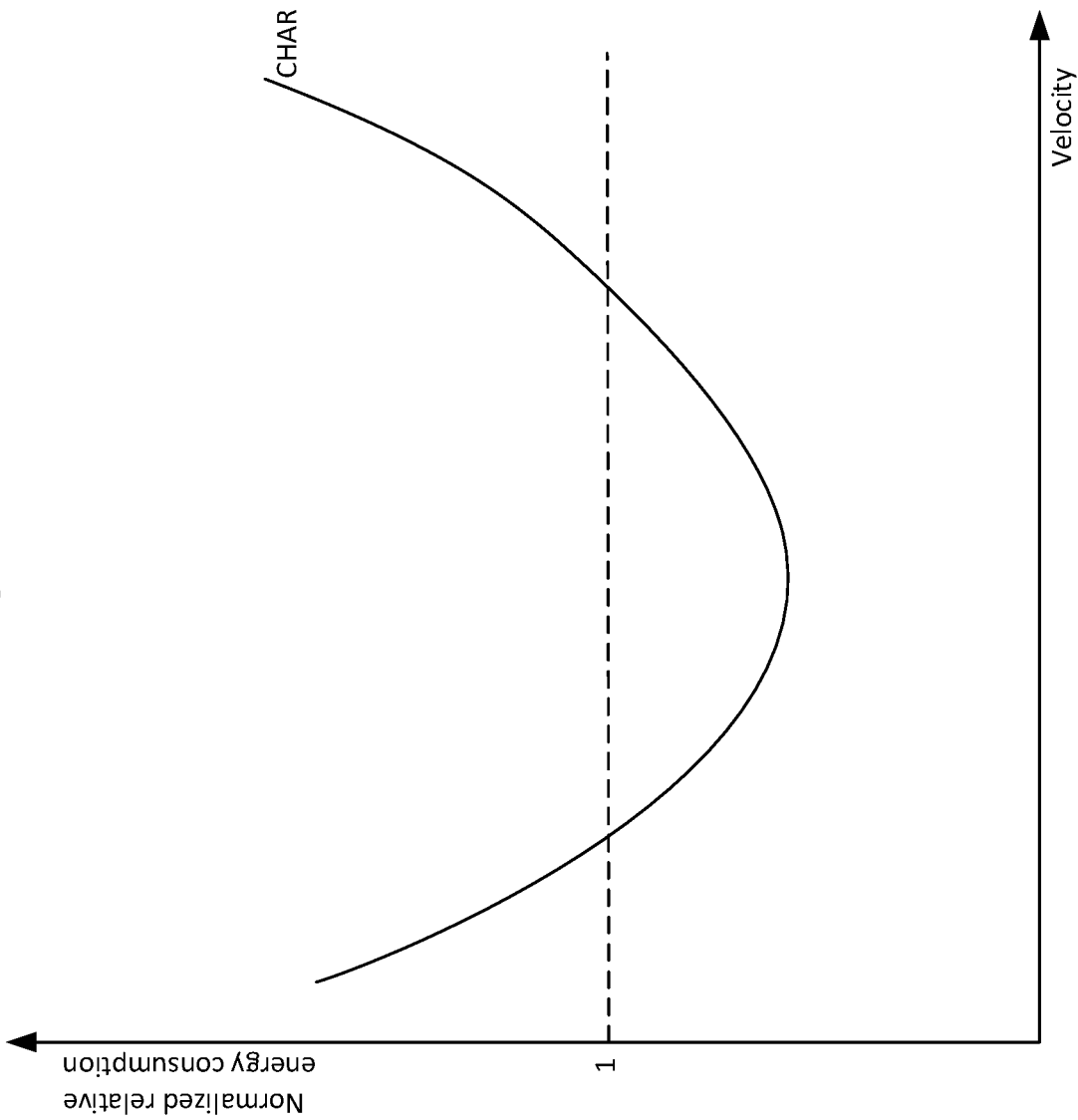
FIGS. 13A and 13B show respective characteristic instantaneous relative energy consumption curves according to the invention.
Figure 13B:
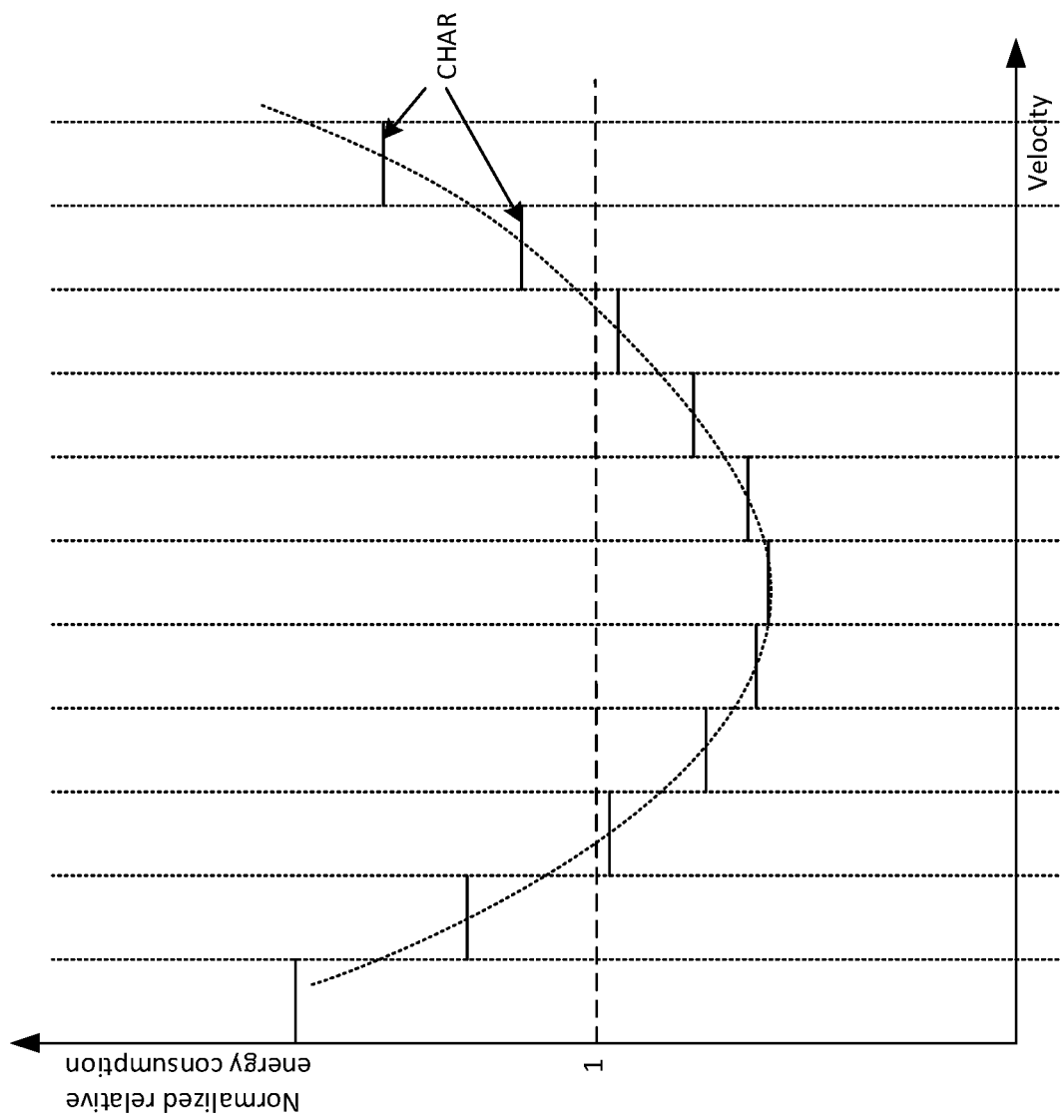

As seen in FIGS. 13A and 13B, the average value of the characteristic vehicle relative energy consumption function CHAR, as seen across the whole allowable or used vehicle velocity range, averages to 1, as indicated by the horizontal line "1".

FIG. 13A is a continuous function, which may be produced by, for instance, adjusting a polygon function of suitable power to best fit a data set comprising, for said previous-trip driving data sets, all observed value pairs (instantaneous vehicle velocity; instantaneous relative energy consumption), and then normalizing the function. Then, for each instantaneous vehicle velocity, a respective characteristic relative energy consumption is indicated by the characteristic function.

FIG. 13B illustrates an alternative way of calculating the characteristic function, in which the function CHAR is a step function corresponding to the one illustrated in FIG. 13A. This approach is particularly advantageous when using the above described interval based basic group conformance measure and driving data set similarity measures. Hence, for each of a number of, preferably non-overlapping and preferably predetermined, vehicle velocity intervals (illustrated in FIG. 13B using vertical lines), the function specifies a respective characteristic instantaneous relative energy consumption value. Apart from this difference, the curve illustrated in FIG. 13B is used in a way which fully corresponds to the curve in 13A.

In particular, it is preferred that the characteristic vehicle relative energy consumption function is calculated based upon an average relative instantaneous vehicle energy consumption for several previous-trip data sets having the same vehicle velocity. In this context, "the same velocity" encompasses velocities belonging to the same velocity interval as shown for instance in FIG. 13B. Preferably, the same velocity intervals are used for the characteristic curve as those described above in the basic driving data set similarity measure.

Preferably, the characteristic vehicle relative energy consumption function is calculated based upon a plurality of basic historic groups of the above defined type, and specifically based upon a respective value of said relative instantaneous vehicle energy consumption for the previous-trip data sets belonging to the respective basic historic group in question. In particular, this pertains to each individual vehicle velocity value used for calculating the function, or to each velocity interval covered by the function, as applicable.

The average value is preferably a geometric average. In case basic historic groups are used, as described above, wherein the relative energy consumption-based group performance measure is calculated, the group performance measure can be used, preferably as it is, as the relative energy consumption for calculating the characteristic curve. Furthermore each relative energy consumption value in the characteristic curve, or each characteristic curve, is also preferably calculated as a weighted average, so that more frequently updated basic historic groups are given larger weight than less frequently updated basic historic groups.

It is preferred that the basic parameter set does not comprise a parameter indicating the vehicle type, such as a VIN (Vehicle Identification Number) of the vehicle in question, but that the only way of characterising the vehicle is using the above described collections and classes.

Fourth Aspect

According to one aspect of the present invention, in order to be able to provide as relevant data as possible when calculating the driving performance parameter, at least some, preferably substantially all, most preferably all of said previous-trip data sets are classified into a set of collections. In the above described case in which basic historic groups are used, these collections are used in addition to the basic historic groups, and the previous-trip driving data sets are hence classified into both a respective basic historic group and a respective collection. As will be described in the following, this may take place by each collection comprising its own set of basic historic groups, which sets may then be overlapping between different collections, and by each previous-trip data set first being classified into a collection and thereafter into a basic historic group within that collection.

It is preferred that each of said collections only comprises previous-trip driving data sets for a particular class of vehicles, and that all previous-trip data sets of one and the same vehicle are classified into one and the same collection based upon a basic class conformity measure between driving data sets for the vehicle in question and a set of class-defining parameters. In other words, each vehicle can be characterised based upon driving data sets observed for that vehicle. In particular, such driving data sets can be used to determine to what vehicle class that vehicle belongs.

The basic class conformity measure is hence a measure of the conformity of a number of individual driving data sets for one and the same vehicle to a particular vehicle class, based upon the class-defining parameters for the class in question. After a vehicle has been associated with a particular class, each driving data set for the vehicle in question is then allotted to the same collection, namely the collection corresponding to the vehicle class to which the vehicle is associated. In case a vehicle is associated to a particular class at one point, and is then reclassified to a different class at a later, second point, the previous-trip driving data sets collected for that vehicle and already allotted to the collection corresponding to the previously associated class can either be reclassified into the collection corresponding to the new associated class, or alternatively only newly collected previous-trip driving data sets can be allotted to the new collection.

Each collection may correspond to exactly one class of vehicles, and vice versa.

According to this aspect of the current invention, illustrated in FIG. 7, before calculating the above-described energy consumption-based trip performance parameter, the current vehicle is classified into a particular one vehicle class, in the following denoted the "current class", of said set of classes, based upon the basic class conformity measure. Then, the collection or a collection (the "current collection") corresponding to the current class is identified. The current collection preferably comprises all previous-trip driving data sets previously observed for all vehicles currently allotted to the current vehicle class.

It is preferred that each current-trip driving data set is mapped, as described above, to at the most one particular basic historic group belonging to the current collection, based upon the above described basic group conformity measure.

Then, an energy consumption-based trip performance parameter value is calculated for the current trip. This calculation is preferably performed as described above, and in particular based upon respective energy consumption-based performance parameter values for previous-trip data sets only in the current collection, as opposed to using all previous-trip driving data sets. Hence, the calculation may be performed based upon a set of basic historic groups to which the current-trip driving data sets are mapped, and corresponding instantaneous relative energy consumption for such basic historic groups, as described above, but wherein said set of basic history groups have all been allotted to the current collection. Hence, when mapping the current-trip driving data sets to basic historic groups as described above, in this case only basic historic groups of the current collection are considered.

Further according to this aspect of the invention, the basic parameter set further comprises instantaneous vehicle velocity and instantaneous engine rotation speed. Then, the class-defining parameters comprise, for each class of vehicles, a characteristic engine rotation speed for a particular vehicle velocity. As indicated above, instead of, or in addition to, the basic parameter set further comprising instantaneous vehicle velocity and instantaneous engine rotation speed, it may comprise instantaneous motor load and instantaneous energy consumption. Then, the class-defining parameters comprise, for each class of vehicles, a characteristic energy consumption for a particular motor load.

By using instantaneous vehicle velocity and instantaneous engine rotation speed at each such vehicle velocity for defining vehicle classes, and in particular by using only these data for defining vehicle classes, a vehicle classification yielding surprisingly accurate results in terms of driving performance parameter values is achieved. This is in particular the case when using a methodology as the one described herein for calculating and processing such parameter values. Furthermore, the invention will produce relevant results even if one and the same vehicle is driven under very different conditions, such as with or without a trailer, on icy or dry roads, with various wind strengths, outdoors temperatures, and so forth.

Figure 6A:
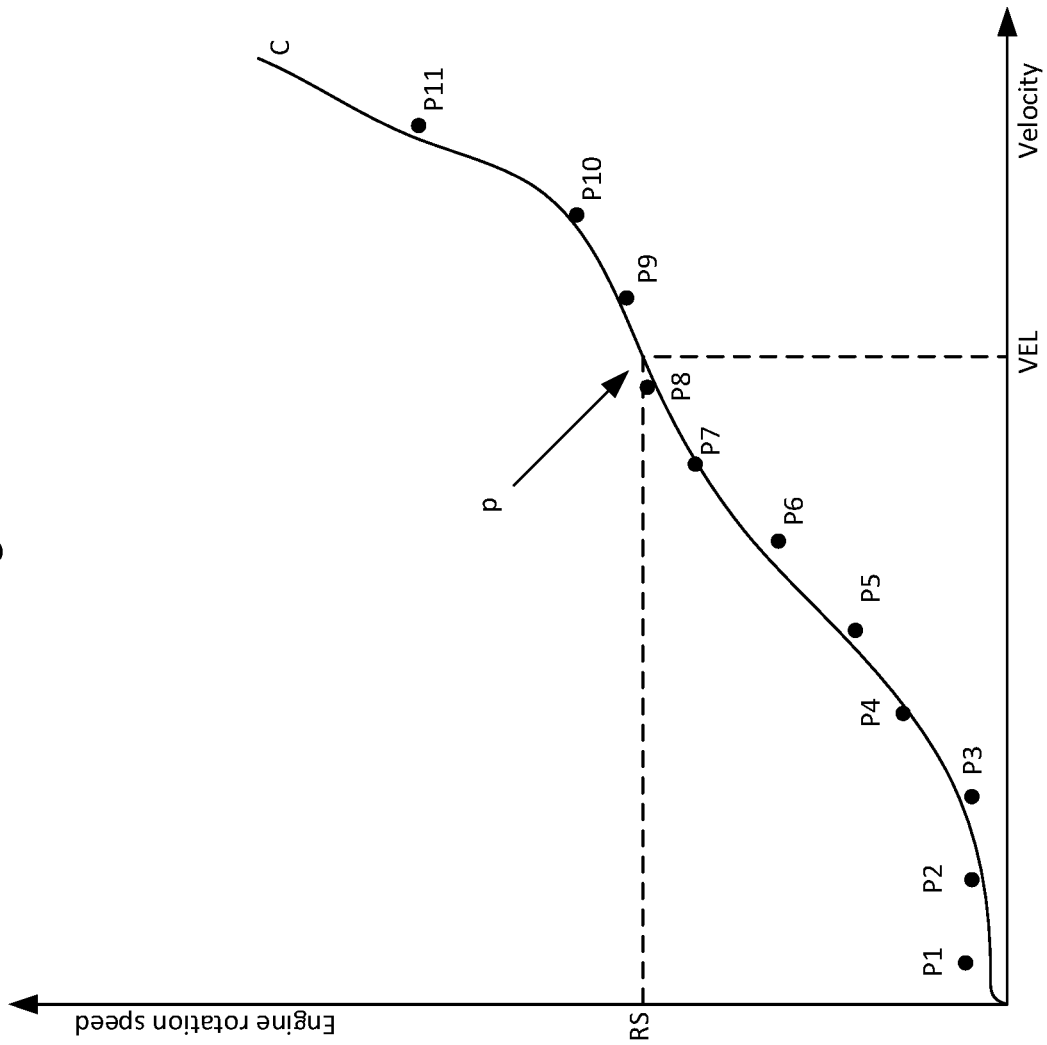

FIG. 6A illustrates an example of an empirically or experimentally measured curve C, defining a typical or average relationship between vehicle velocity and engine rotation speed, for a particular class of vehicles. The curve C may be determined by, for instance, using all driving data sets in the collection corresponding to the class in question, for each instantaneous vehicle velocity calculating an average engine rotation speed.

At a particular point P, a particular instantaneous vehicle velocity VEL corresponds to a particular instantaneous engine rotation speed RS. Hence, P is an example of a class-defining parameter for that particular class of vehicles. This point P could be calculated as an average engine rotation speed for all observed driving data sets in the collection in question, that is for vehicles in the class in question, and having the instantaneous vehicle velocity VEL.

A class conformance measure could then, for example, be constructed and used as follows:
1) Construct a curve, corresponding to curve C, but for an individual particular vehicle the conformance of which is to be determined. The curve is constructed based upon driving data sets observed for that vehicle, such as by taking the average observed engine rotation speed for each observed velocity and then adjusting a polygon function to best fit the achieved pairs of data points for all velocities.
2) For the particular velocity VEL, calculate the distance between the constructed curve and the point P.
3) In case the distance is smaller than a predetermined largest allowable distance, the conformance measure turns out in the positive, and the vehicle in question is allotted to the class of vehicles in question.

FIG. 6B illustrates a more complicated, and preferred, embodiment, in which the class-defining parameters comprise, for each class of vehicles, a respective characteristic engine rotation speed for a plurality of vehicle velocities. In this exemplifying case, the velocity axis is divided into a series of non-overlapping intervals, preferably the same as the above-discussed non-overlapping intervals for mapping driving data sets into basic historic groups. Then, for each such interval, a corresponding allowed engine rotation speed interval is defined. In FIG. 6B, these engine rotation speed intervals are of equal length, but they may also, for instance, be broader for vehicle intervals for which there are fewer observed previous-trip driving data sets in the collection in question.

Then, a class conformance measure could be constructed and used as follows:
1) For a respective vehicle velocity point P1, [ . . . ], P11 in each velocity interval, calculate an average engine rotation speed for the particular vehicle that is to be classified. This value can be calculated using interpolation in addition to averaging, in case data is not available for the particular vehicle velocity value in question. In this case, the engine rotation speed intervals can be viewed as the class-defining parameters.
2) For each point P1, [ . . . ], P11, calculate whether or not the point is within the respective engine rotation speed interval.
3) In case each point Pa, [ . . . ], P11, or at least a certain predetermined proportion of the points, is or are within the respective engine rotation speed interval, the conformance measure turns out in the positive, and the vehicle in question is allotted to the class in question.

From FIG. 6A, it is clear that the particular exemplifying vehicle represented by points P1, [ . . . ], P11 is allotted to the class represented by curve C and the illustrated set of engine rotation speed intervals.

It is realized that many different ways of performing such a conformance measurement between a particular vehicle and a particular collection are thinkable and possible. For instance, when there are many classes, one particular vehicle could be found to conform to several such classes. In that case, the conformance measure can further comprise a closeness measure, based upon which the single class to which the vehicle is closest is the one to which the vehicle is mapped. This closeness measure may, for instance, comprise a measure of engine rotation speed distance to the centre of each engine rotation speed interval for each point P1, [ . . . ], P11, or another suitable measure.

According to one preferred embodiment, the class-defining parameters are mutable, and in particular dynamically updated as new driving data set data becomes available. Hence, it is preferred that the class-defining parameters for a certain class, preferably for all classes or at least substantially all classes, are automatically and dynamically updated in response to the collecting of previous-trip data sets, so that the characteristic engine rotation speed for a particular vehicle velocity in question is updated in response to the observation and collecting of a set of instantaneous vehicle speed and instantaneous engine velocity data values for a particular vehicle which has been classified into the certain class. This may take place by identifying a corresponding basic historic group in the collection, corresponding to the class in question, to which the previous-trip driving data set in question is mapped; updating that basic historic group; and then using the updated basic historic group together with other basic historic group involving similar vehicle velocity data to update the class-defining parameters. This way, the class definitions will automatically become more accurate as more data becomes available to the system.

When setting up a new system according to the present invention, it may be so that no driving data set information is available. In that case, a standard set of initial vehicle classes, as defined by corresponding class-defining parameters can be assumed as a starting point, after which the class definitions may evolve over time as new data becomes available. Alternatively, the system uses a basic set of driving data sets, and the initial classes may be calculated based upon the basic set of driving data sets, and then the class definitions may evolve from there during the use of the system.

In either case, and also in other cases, from time to time a vehicle will be observed, the driving data sets of which are quite far from the closest class definition (as measured by said class conformity measure). In this case, it is preferred that the system may recognize this vehicle as belonging to a new vehicle class and as a reaction create such a new class based upon the driving data sets collected for that vehicle. Thus, in case a particular vehicle is found to be further away from each of said classes than a predetermined threshold distance, as measured by the basic class conformity measure, an additional class is created, together with corresponding class-defining parameters and a corresponding collection. The class-defining parameters of the newly created class are then preferably calculated based upon the previous-trip driving data sets observed for the vehicle in question. It is further preferred that one single such vehicle, performing one single trip during which it is observed to be far away from the closest existing class, does not trigger the creation of a new vehicle class, but that at least a certain minimum number of vehicles and/or a certain minimum number of trips is required in order to actually launch the new vehicle class. The system may also comprise limitations for class creation based upon trusted vehicles (see above). In the latter case, a minimum number of trusted vehicles may be required to be observed to belong to a new class before such new class is actually created.

As the number of classes grows, it is preferred that the basic class conformity measure is adjusted correspondingly, so that each existing class more narrowly defines the respective vehicle, for instance by using more and more narrow velocity and/or engine rotation speed intervals of the type described above, so that the threshold, in terms of distance from the closest existing class, used as a requirement to launch a new vehicle class, becomes lower and lower. For instance, interval lengths may be calculated based upon the total number of classes and/or the total number of observed previous-trip driving data sets in the database 151.

This way, a more and more granular and fine-tuned set of vehicle class definitions will be created over time, as more data becomes available to the system, in a way which is fully automatic and produces vehicle classes that actually correspond to the main types of vehicles that use the system. It is noted that no a priori knowledge about such vehicles is necessary to achieve these results.

Figure 7:
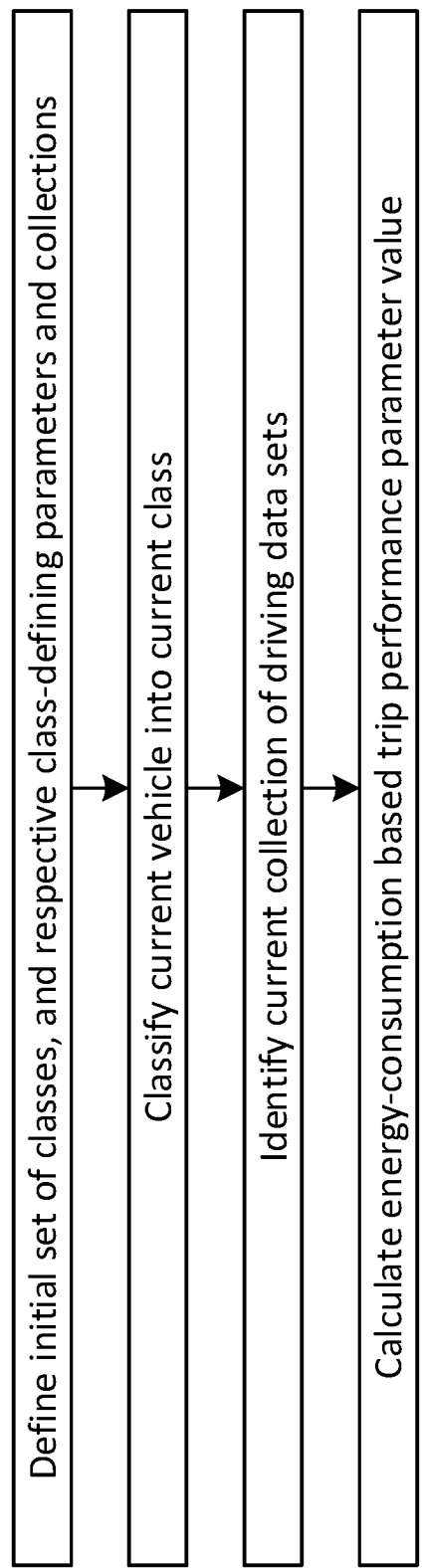
FIGS. 7-12 are respective flowcharts illustrating methods according to the present invention.
Figure 8:
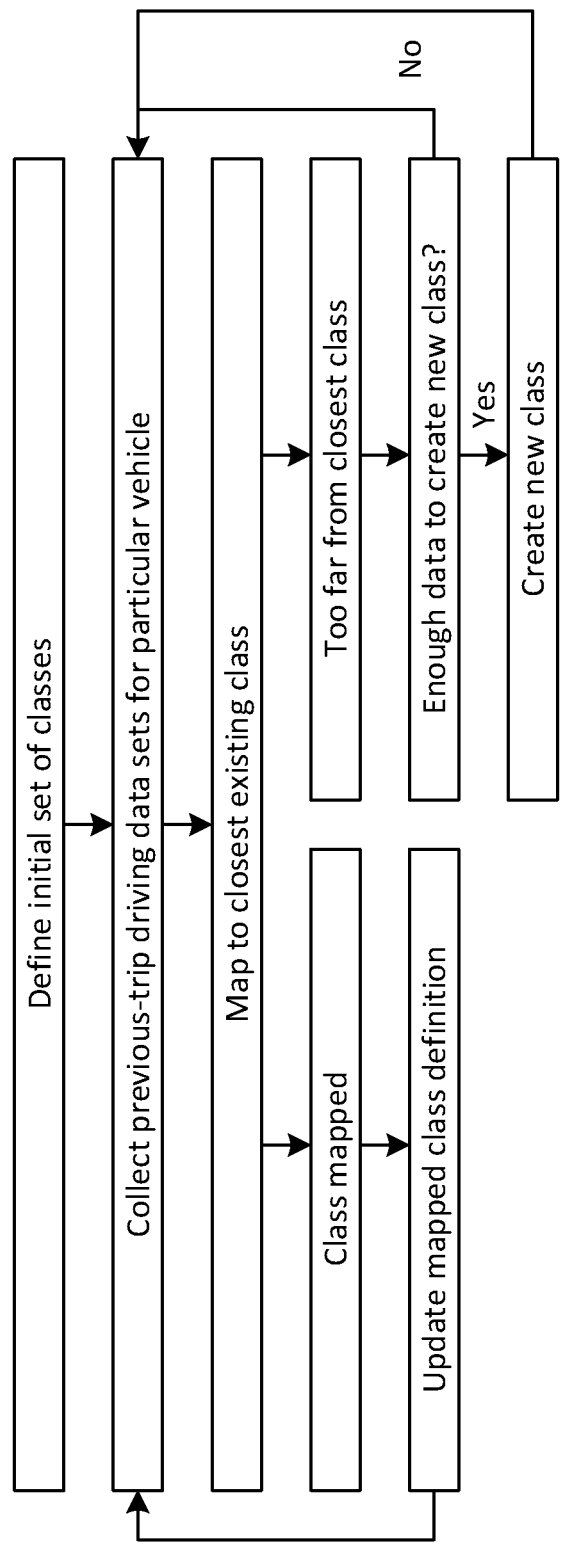

FIG. 7 illustrates the above described methodology. In a first step, an initial set of classes is defined. Then, previous-trip driving data sets are collected, for a particular vehicle, but over time for many different trips performed by many different vehicles. For each such observed vehicle, the vehicle in question is mapped to the closest existing class, as described above and based upon said previous-trip driving data sets and the class-defining parameters for the respective class. In case the vehicle was successfully mapped to a class, the mapped class is updated, by the previous-trip driving data sets updating the basic historic groups of the corresponding collection, and the method loops back to collecting previous-trip driving data sets. On the other hand, in case the vehicle was found to be too far from the closest class, it is investigated whether or not enough data indicating the motivation to create a new class has been collected, as described above. In case this is so, a new class is created, the class-defining parameters of which are based upon the collected driving data sets of the vehicle in question, possibly in combination with previous-trip driving data sets observed and collected for additional vehicles that are also used for the creation of the new class. Thereafter, the method loops back again to the collecting of previous-trip driving data sets, using the updated set of class definitions.

Each observed vehicle is preferably mapped to a particular single class before a performance parameter is calculated for that particular vehicle, and the calculation of the performance parameter is preferably based only on driving data sets of the corresponding collection. However, a reclassification of each vehicle may be achieved less frequently than each observed trip, preferably less frequently than every ten trips. However, the updating of the class-defining parameters of the class to which a particular vehicle is allotted is preferably performed at least in connection to the finalizing of each trip performed by the vehicle in question.

According to one preferred embodiment, the class-defining parameters do not comprise information regarding vehicle gear used. The surprising finding of the inventor is that gear number information does not significantly improve the results, in terms of classification accuracy for the purpose of producing relevant driving performance parameter values. It is even so that, since the gear usage affects the engine rotation speed for a particular vehicle velocity, it is difficult to predict suitable class-defining parameter values for a particular vehicle, even in the case in which all technical data about the vehicle is known. Hence, in case a particular known vehicle type, such as a newly launched car model of a particular brand, it is preferred that a new vehicle class is created, if needed, automatically by simply connecting one or several cars of the newly released model, preferably marked as "trusted", and then allow the system to automatically discover and define a new set of class-defining parameters for the car model in question, based upon the driving data sets observed for these vehicles.

According to one preferred embodiment, in addition to the above defined collections of previous-trip driving data sets and/or basic historic groups, there is a main collection defined, comprising respective previous-trip driving data sets, and in particular basic historic groups corresponding to, such as having identical respective definition as, all respective basic historic groups comprised in all of the above described collections. In this case, a corresponding basic historic group in the main collection is always updated with respect to its group performance parameter when a group performance parameter of a corresponding basic historic group in another collection is updated. Hence, data of the basic historic groups of the main collection reflect the data of all basic historic groups in other collections. According to one preferred embodiment, the data of the basic historic groups in the main collection can be used instead of basic historic groups for a particular other collection under certain conditions. For instance, a suitable class may not exist to which the current vehicle can be mapped, or the current collection may not have enough updated group performance data in order to produce a reliable result.

Fifth Aspect

According to one aspect of the invention, the above-discussed trip performance parameter value is calculated as a first trip performance parameter value in a way which is similar to the trip performance parameter value calculation methodology described above in connection to FIG. 4. In fact, everything described in connection to FIG. 4 is relevant also to this aspect of the invention, as applicable.

Figure 9:
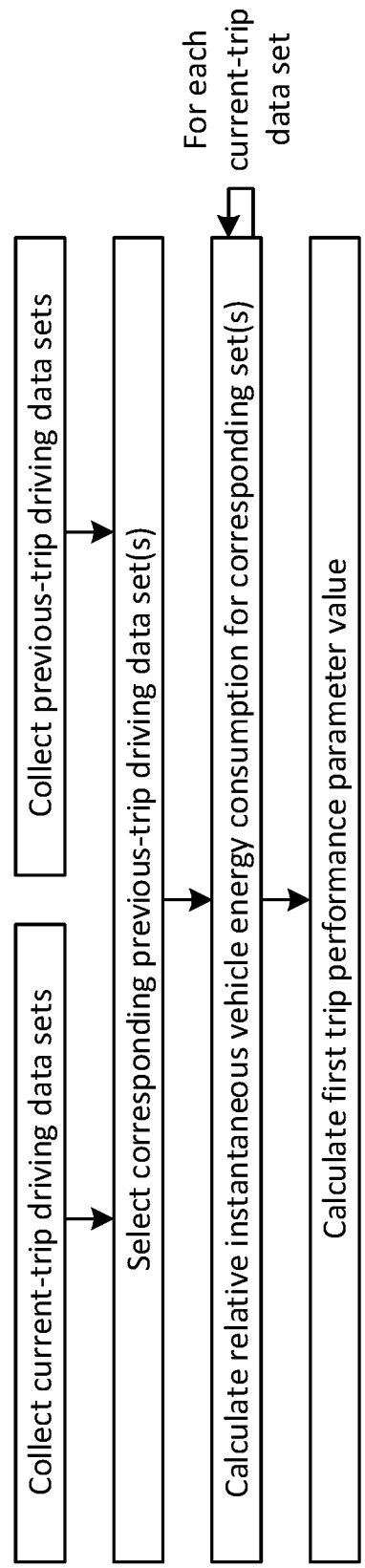

This present aspect is further illustrated in FIG. 9, wherein it is shown that, in a first step the previous-trip and current-trip driving data sets are collected, as described above.

Then, for each of the collected current-trip data sets, at least one corresponding collected previous-trip data set is selected based upon the above described basic driving data set similarity measure, which is arranged to measure similarity between driving data sets, and/or the above described basic group conformity measure, which is arranged to measure conformity for a current-trip data set to a basic historic group of previous-trip data sets. Hence, according to one embodiment, current-trip driving data sets are selected by mapping to individual previous-trip driving data sets, and these selected previous-trip driving data sets are used for the subsequent calculations. However, it is preferred that the above described mechanism using basic historic groups, preferably also using the above described classes and collections, is employed.

Thereafter, a relative instantaneous vehicle energy consumption value is calculated for said selected corresponding previous-trip data set or sets, which relative energy consumption is relative to a total energy consumption for a respective trip during which the previous-trip data set in question was observed. It is understood that, in case the basic historic groups are used, the selected previous-trip driving data sets are the ones comprised in the basic historic groups to which the current-trip driving data sets were mapped. In particular, it is preferred that the relative instantaneous vehicle energy consumption value is calculated for the respective previous-trip data sets in a basic historic group to which the current-trip data set in question is mapped, in relation to a total energy consumption for the complete trip during which the previous-trip data set in question was observed, and further preferably based upon an average value of said relative instantaneous energy consumption values for mapped respective basic historic groups.

In a last step, the first current-trip driving performance parameter value is calculated based upon an average value of said calculated relative instantaneous energy consumptions.

Hence, the respective relative energy consumption for each individual previous-trip driving data set is a measure of the relative "goodness", in terms of low energy consumption, that the previous-trip driving data set in question was associated with during the previous trip in question. Similarly, the respective group performance parameter value for each historic group, is a measure of the "goodness" that previous-trip driving data sets that have a similar footprint in terms of basic parameter set values on average are associated with. Then, the first performance parameter is a measure of the average such "goodness" associated with previous-trip driving data sets, or basic historic groups, which are similar to the collected current-trip driving data sets.

Hence, by breaking a current trip apart into a large multitude of small current-trip driving data set observation fragments, associating them with previously observed such fragments and calculating the first trip performance parameter value in the way illustrated in FIG. 9, the above advantages in terms of automatically and accurately assessing comparable driving performance with little a priori knowledge and under shifting conditions are achieved, and the resulting first trip performance parameter value constitutes an easily accessible, numerical value that is directly useful as a trip performance measure. Hence, the trip performance parameter value can be displayed to the driver during or after the current trip, as described above, but it can also readily be used for making direct comparisons between different trips and drivers, and even between different vehicles, since the first trip performance parameter is generally independent of driver and driving conditions. In particular, in case the mechanism using classes and collections described above is used, the first performance parameter value will also be generally independent upon vehicle type, so that a trip using a bus is readily comparable to a trip using a small car.

The portable electronic device 130, or alternatively the current vehicle 100 itself, is preferably arranged with a piece of software arranged to present to the driver of the current vehicle a graphical user interface, in turn arranged to present information comprising a representation of the calculated first trip performance parameter value for the current trip, and possibly also for previously conducted current trips for the same driver, and possibly also for other previous trips.

The portable electronic device 130 software may be a piece of software executable by or from the portable electronic device 130, such as a locally installed and executed application, a remotely executed application, such as a web page application accessed from the portable electronic device 130, or any other suitable type of software.

In the preferred case in which the first trip performance parameter is calculated repeatedly, by central sever 150 or local server 160, during the current trip, based upon the so far collected current-trip driving data sets, it is preferred that a representation of an updated first parameter value is presented to the driver on said graphical user interface during the current trip.

It is furthermore preferred that the calculated first trip performance parameter values calculated for previous trips are stored in the database 151 and are made available via a suitable application programming interface (API) provided by the central server 150. This way, the manager of a fleet of transport vehicles, or similar, can follow the progression of the fleet in terms of driving performance over time, and perform analyses based upon first trip performance parameter value data for the fleet.

In a particularly preferred embodiment, the first performance parameter is used to calculate a benchmark value. Once a plurality of first performance parameter values have been calculated, preferably for a plurality of different trips with a plurality of different vehicles and by a plurality of different drivers, the system determines a threshold first trip performance parameter value such that only a minor percentage, such as 10%, of all calculated trip performance parameter values, are better than the threshold value. Then, each newly calculated first trip performance parameter value can be compared to the benchmark value to see how far from the 10% top previous trip performances that the current trip was.

It is furthermore preferred that the benchmark value is updated based upon first trip performance parameter values calculated with respect to the current trip, at least as long as the benchmark value has not converged so that it substantially does not change with the updating of newly calculated trip performance parameter values. It is preferred that the benchmark value is made accessible throughout the system as a global variable.

Sixth Aspect

In one aspect of the invention, the value of a second trip performance parameter is calculated, based upon several previously calculated trip performance parameter values, preferably but not necessarily several previously calculated trip performance parameter values of the above explained type, namely the first trip performance parameter value.

In general, the second trip performance parameter value is calculated based upon the same data as the first trip performance parameter value, in terms of previous-trip and current-trip driving data sets, basic historic groups, vehicle classes, collections, etc., as described in detail above. However, the idea behind the second trip performance parameter value is more generally applicable than that of the first trip performance parameter value. In particular, it is not strictly necessary, albeit preferred, that the basic parameter set, for the purposes of calculating the second trip performance parameter value, comprises instantaneous vehicle energy consumption. Instead, some other parameter or combination of parameters comprised in the basic parameter set can be used to in some respect measure the relative quality of each previous-trip driving data set, such as parameters measuring tyre wear (for instance a suitable parameter combination of observed break usage and turning magnitude in relation to vehicle velocity). Such non energy consumption-based parameters may be used in case the measurement aim is different from the one described in detail herein below, but in case the basic mechanism of the second trip performance parameter calculation, and its general advantages are still desired.

For reasons of simplicity, in the following the calculation of the second trip performance parameter will be described as if the basic parameter set comprises instantaneous energy consumption. In general, everything which is said in relation to the first trip performance parameter herein is equally useful for the purposes of calculating and using the second trip performance parameter value.

Figure 10:
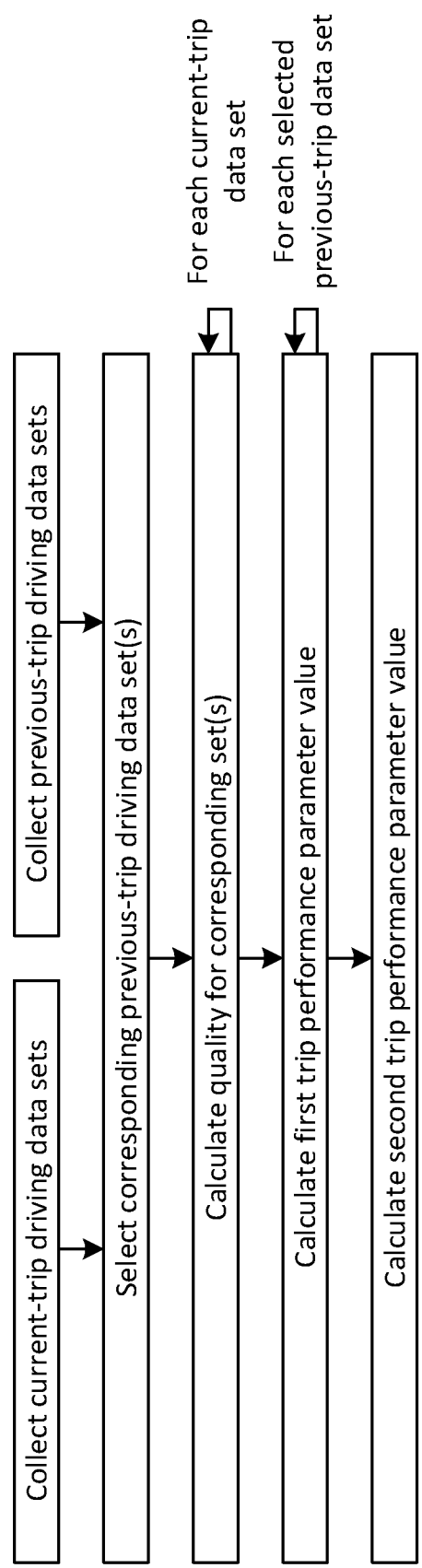

FIG. 10, which is similar to FIG. 9, illustrates the basic methodology for calculating the second trip performance parameter value according to the present aspect of the invention. In a first step, current-trip and previous-trip driving data sets are collected, as described above, and for individual current-trip driving data sets corresponding previous-trip driving data sets are selected. Thus far in the method, this aspect is in many regards the same as for the aspect described above in connection to FIG. 9.

However, for each selected previous-trip driving data set, a quality measure is then calculated. This quality measure may be the above described relative energy consumption-based performance measure, but may also be something else.

Thereafter, a respective first trip performance parameter value is calculated for each previous-trip data set, which first trip performance parameter may be the same as the above-described first trip performance parameter. However, it may also be another suitable type of trip performance parameter, the value of which is calculated based upon the quality measure. Preferably, the first trip performance parameter is a relative trip performance parameter arranged to measure the relative trip performance of the previous-trip driving data set in question in relation to the trip during which the previous-trip driving data set was observed. In the exemplifying case in which the quality measure is a combination of instantaneous break and turn data, the first trip performance parameter for each previous-trip driving data set may be a relative value for this instantaneous break/turn parameter as compared to an average value of said parameter for the complete trip during which the previous-trip driving data set in question was observed.

In a final step, the second trip performance parameter value is calculated based upon the respective values of the first trip performance parameter for each of the selected previous-trip data sets.

Figure 11:
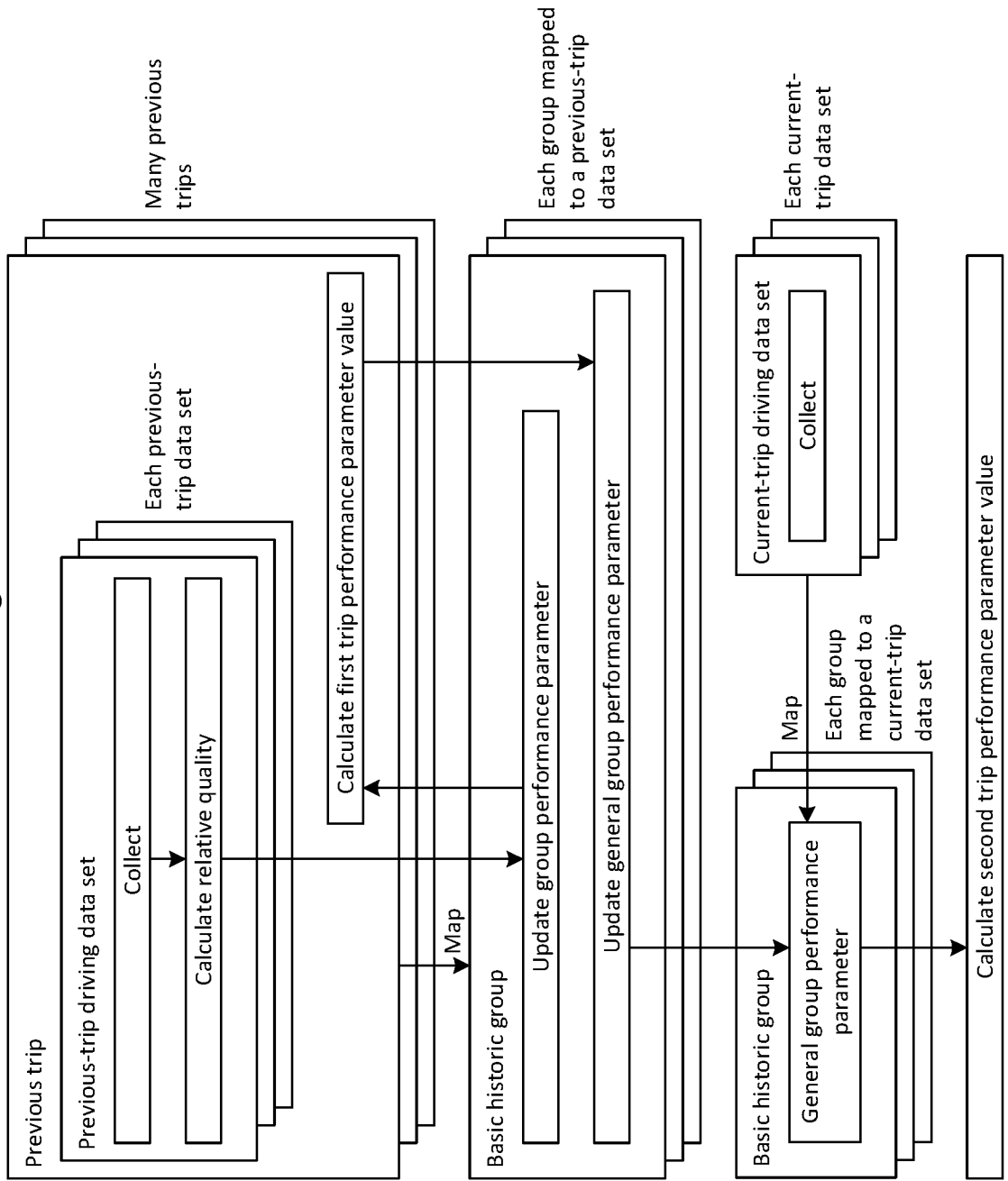

FIG. 11 illustrates a method according to the present aspect of the present invention, in particular in which the above described basic historic groups are used for the calculation of the second trip performance parameter.

Hence, in a first step, for many previous trips, such as for at least 100 previous trips, preferably at least 1000 previous trips, respective previous-trip driving data sets are collected. For each such previous-trip driving data set, a relative quality measure is calculated, preferably relative to a total quality for the complete previous trip during which the previous-trip driving data set in question was collected, in particular preferably the above described instantaneous relative energy consumption.

In a second step, each previous-trip driving data set is mapped to a basic historic group.

In a third step, for each such mapped basic historic group, a respective group performance parameter value, preferably the above described energy consumption-based group performance parameter, is updated using the calculated relative quality measure.

In a fourth step, a first trip performance parameter value, preferably the above described energy consumption-based one, is calculated for each of said many previous trips, based upon the updated group performance parameters for the mapped respective basic groups.

It is noted that, in this fourth step, each previous trip can be regarded as a current trip, and that the first trip performance parameter value then corresponds to the above described trip performance parameter calculated for a current trip.

In a fifth step, again for all of said many previous trips, a respective general group performance parameter is updated for each of the respective mapped basic historic groups corresponding to the previous-trip driving data sets observed during the previous trip in question, which update is based upon the updated respective first trip performance parameter value calculated in the fourth step. Preferably, the general group performance parameter is an average value, such as a geometric average, of the respective first trip performance parameter values previously calculated for all previous-trip driving data sets mapped to the basic historic group in question.

In a sixth step, current-trip driving data sets are collected for a current trip.

In a seventh step, each such current-trip driving data set is mapped to a respective basic historic group, in the way described above.

Then, in an eighth step, the second trip performance parameter value is calculated based upon the respective general group performance parameter values calculated for all basic historic groups to which current-trip driving data sets are mapped. Preferably, the second trip performance parameter value is calculated as an average value, such as a geometric average value, of the general group performance parameter values. The average value can also be a weighted average value, such as an average value in which more frequently updated basic historic groups are given more weight than less frequently updated basic historic groups. In case not all current-trip driving data sets correspond to a respective existing basic historic group, the averaging function may ignore those current-trip driving data sets for the purpose of calculating the second trip performance parameter value.

Using the present system and method for calculating, for a current trip, said second trip performance parameter in the above described way achieves the surprising effect that the value of the second trip performance parameter constitutes a very accurate measure of the risk level assumed by the current driver. In other words, the second trip performance parameter measures the risk behaviour of the driver. Apart from this aspect, all the advantages described above, in relation to the calculation of the first trip performance parameter, also apply to the second trip performance parameter.

It is preferred that the second trip performance parameter is made available to the current driver after or during the current trip in a way which completely corresponds to the case for the first trip performance parameter, as described above. It is also preferred that the second trip performance parameter values for individual drivers and/or collectives of drivers are used for evaluation and risk assessment purposes. For instance, an insurance company may use the value of the second trip performance parameter as an input in the calculation of car insurance premiums. Furthermore, such second trip performance parameter value may be used to identify risk-assuming individuals or groups of drivers for the purposes of improving the operations of a transport company. There are numerous other ways in which such a measure of risk can be used.

According to one preferred embodiment corresponding to FIG. 11, the collected previous-trip data sets are classified into one of a plurality of different predetermined basic historic groups based upon said basic similarity measure, and each current-trip data set is mapped to at the most one of said basic historic groups based upon said basic group conformity measure. Then, each of the previous-trip data sets are further mapped to at the most one of said basic historic groups, at the time comprising previous-trip data sets observed before the previous-trip data set in question was observed, based upon said basic group conformity measure.

It is understood that the above-described preferred case in which the first (and consequently also the second) trip performance parameter is calculated based upon a measure of the instantaneous energy consumption of the previous vehicles, the qualified driving data parameters of the previous-trip driving data sets comprise instantaneous energy consumption. Then, the method comprises a step in which a relative instantaneous vehicle energy consumption value is calculated for said previous-trip data sets, which relative energy consumption is relative to a total energy consumption for a respective trip during which the previous-trip data set in question was observed. Furthermore, in this case the first trip performance parameter value is calculated based upon such calculated relative energy consumption values.

In particular, in this case it is preferred that, for the respective basic historic group to which each current-trip data set is mapped, and for each further basic historic group to which each previous-trip data set comprised in the basic historic group in question is in turn mapped, a respective relative instantaneous vehicle energy consumption value is calculated, which relative energy consumption is relative to a total energy consumption for a respective trip during which the previous-trip data set in question was observed. Furthermore, in this case each of said first trip performance parameters is calculated based upon an average value of said relative instantaneous energy consumption values.

It is noted that, in case the methodology with vehicle classes and collections described above is used, all calculations leading up to the second trip performance parameter value are limited to the current collection.

Seventh Aspect

Figure 14:
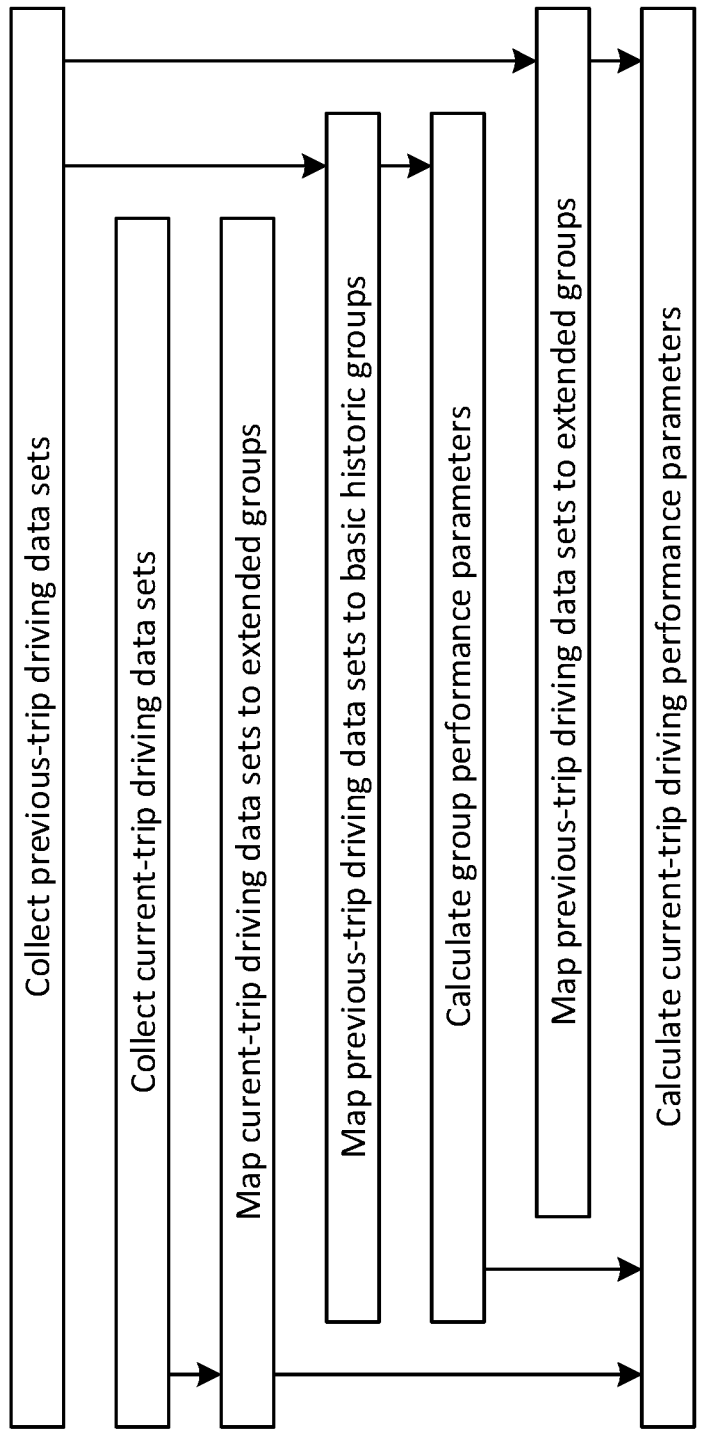
FIGS. 14 and 15 are respective flowcharts illustrating methods according to the present invention.

In one aspect of the invention, illustrated in FIG. 14, current-trip and previous-trip driving data sets are collected in a first step. Specifically, updated current-trip driving data sets are repeatedly read from the vehicle, wherein new such current-trip driving data sets are read from the vehicle at consecutive observation time points separated by at the most a predetermined observation time period. This is similar to the above described aspects of the present invention. However, the current-trip driving data sets in the present aspect each comprise data from at least a predetermined set of extended driving data parameters.

Furthermore, in the present aspect, the previous-trip driving data sets also comprise the extended driving data set parameters, and in addition thereto the previous-trip data sets each comprises parameter values for a predetermined set of a qualified parameters. The qualified parameter set, in turn, comprises the parameters of the above defined basic parameter set as well as, or comprising, instantaneous vehicle energy consumption.

Hence, the qualified parameter set at least comprises the basic parameter set. In case the basic parameter set does not comprise instantaneous vehicle energy consumption, the qualified parameter set adds this parameter as compared to the basic parameter set. The extended parameter set, in turn, comprises parameters that may or may not have an overlap with the qualified parameter set, as explained below. To sum up, in this aspect each previous-trip driving data sets comprises value for the basic parameter set as well as additional information.

The possible order of the various steps in this aspect is illustrated by arrows in FIG. 14.

Hence, in a second step, the collected previous-trip driving data sets are allotted to basic historic groups, as described above using the basic driving data set similarity measure operating on the basic parameter set values of the previous-trip driving data sets.

In a third step, the value of a respective group performance parameter is then calculated for each basic historic group, in a way that may be as described above. Specifically, the group performance parameter may, but needs not, be a relative energy consumption-based performance parameter as described above. It is preferred that the group performance parameter value is calculated based upon only the qualified parameter set for each basic historic group.

In a fourth step, the previous-trip driving data sets are grouped into a set of historic extended groups of previous-trip driving data sets, such that each previous-trip driving data set is allotted to one such extended historic group. Like is the case for the above described basic historic groups, each such extended historic group is a group of previous-trip driving data sets. However, in contrast to the case for the basic historic groups, previous-trip driving data sets are allotted to one of said set of extended historic groups based upon an extended driving data set similarity measure, which extended similarity measure is arranged not to take all values for said basic parameter set into consideration that are taken into consideration by the basic similarity measure. An extended group conformance measure may also be used, which then corresponds to the above described basic group conformance measure.

That the extended similarity measure is arranged not to take all values for the basic parameter set into consideration that are taken into consideration by the basic similarity measure means that at least one parameter of said basic parameter set is not used for calculating the value of the extended similarity measure for the purposes of grouping together previous-trip driving data sets in extended historic groups. However, it is preferred that none of the parameters in the basic parameter set is used for such calculation. Nevertheless, a certain parameter which forms part of the basic parameter set can be a parameter measuring the same thing but in a different way, and hence count as not the same parameter for these purposes. For instance, even if the basic parameter set comprises vehicle speed, and the previous-trip driving data sets comprises such a parameter value, measured on the actual vehicle engine or the wheel axis, the extended parameter set may also comprise vehicle speed, and the previous-trip driving data sets may then also comprise a vehicle speed value as measured using a GPS component in the portable electronic device 130. It is noted that, even though these parameter values correspond to the same metric, they are in general not numerically the same, and are subject to different artefacts and error sources. There are numerous other examples in which a certain metric can be measured both directly on vehicle hardware and in some other way, for instance using sensors of the portable electronic device 130 such as GPS, accelerometer, gyro, compass, etc. components. Hence, the measurement method may be part of the definition of a "parameter".

In a fifth step, for each of said collected current-trip data sets, the current-trip data set in question is mapped to at the most one particular one of said extended historic groups, based upon an extended group conformity measure between a driving data set and an extended historic group.

The extended group conformity measure may be similar to the above discussed basic group conformity measure, in that it may, for instance, use predefined intervals for the extended parameter set values and allot a certain current-trip driving data set to a certain extended historic group in case all extended parameter values of the current-trip driving data set fall within the corresponding interval of the extended historic group in question.

In a sixth step, a current-trip driving performance parameter is calculated based upon the group performance parameter values calculated for each respective basic historic group corresponding to the previous-trip driving data sets comprised in the extended historic group to which a current-trip data set was matched in the fifth step.

Hence, the extended historic groups, that are used in parallel to the basic historic groups to classify collected previous-trip driving data sets, but that use the extended parameter set to perform the classification as opposed to the basic parameter set, constitutes a link between data measured on the vehicle and externally measured data or data read otherwise not in direct contact with the vehicle as such. By mapping current-trip driving data sets to external groups, it is possible to use the information represented by previous-trip driving data sets in the same or corresponding way as described above, even in case the current-trip driving data sets do not comprise the basic parameter set and are therefore not possible to map to a particular basic historic group based upon the above described basic similarity or conformance measure.

It is even preferred, in the present aspect of the invention, that the current-trip driving data sets do not comprise said basic parameter set, at least to the extent to which sufficient data is lacking such that using the above described basic similarity and/or conformance measures becomes impossible. In some embodiments, it is enough that only one basic parameter is lacking from the extended parameter set for such use to be impossible.

Figure 15:
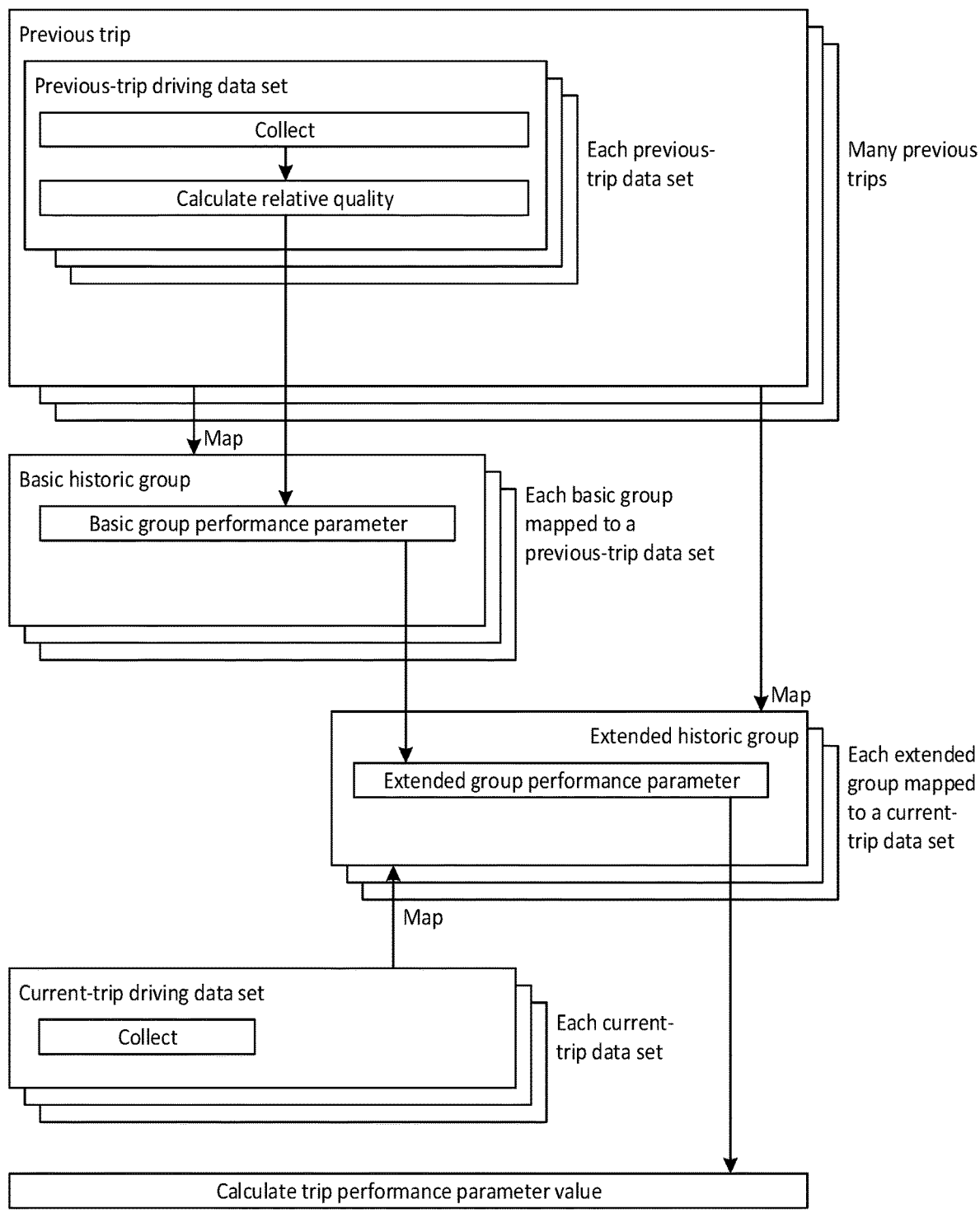

FIG. 15 is a more detailed view of an exemplifying embodiment of the present aspect.

Firstly, previous-trip driving data sets are collected for many previous trips, and a relative quality (such as an energy consumption-based quality in relation to a corresponding complete trip) is calculated for each collected previous-trip driving data set, as described above.

Each collected previous-trip driving data set is mapped to a particular one basic historic group, based for instance upon the basic conformity or similarity measure, and the respective basic group performance parameter is updated using the calculated relative quality value.

Furthermore, each collected previous-trip driving data set is mapped to a particular one extended historic group, based upon said extended similarity or conformance measure. For each such mapped extended group, a corresponding extended group performance parameter value is updated using a corresponding basic group performance parameter value taken from the basic group to which the previous-trip driving data set was allotted.

Recalling that the basic group performance parameter may be a, possibly weighted, average value of the relative quality measures calculated for each previous-trip driving data set allotted to the basic historic group in question, the extended group performance parameter may, in a corresponding way, be an average value of the corresponding basic group performance parameter values used to calculate the extended group performance parameter. In particular, it is preferred that the extended group performance parameter is a weighted average value, wherein more frequently used basic historic groups are given larger weight than less frequently used basic historic groups.

As a result, each extended group performance parameter will, over time as the system is used, become a measure of average relative driving quality for the basic historic groups to which the same previous-trip driving data sets were allotted as were allotted to the extended historic group in question.

When the current-trip driving data sets are then collected, they are each mapped to a respective one extended historic group, and the respective extended group performance parameter values of the mapped extended historic groups are used to calculate a trip driving performance parameter value, which is then used as the trip performance parameter values described above.

According to a present invention, the extended parameter set comprises at least one parameter from a parameter list comprising GPS-based velocity, GPS-based acceleration, altitude, accelerometer-based acceleration and compass-based heading. The list may also comprise corresponding changes over a predetermined time period, in a way which corresponds to the above described instantaneous vehicle velocity and instantaneous vehicle velocity change, as well as to instantaneous engine speed and instantaneous engine speed change.

It is furthermore preferred that at least one of said current-trip driving data set values, preferably all of the current-trip driving data set values, are either registered by the current vehicle, which vehicle is connected to a central server via a wireless connection, or, even more preferably, registered by a portable device arranged in the current vehicle, which portable device is connected using a wireless connection to the central server.

This way, a current vehicle which itself has no capability of recording data corresponding to the basic parameter set can still be used with the system, by recording data corresponding at least to the extended parameter set, and then receiving a trip performance parameter value which draws upon the total previous-trip driving data set pool collected for previous vehicles that in fact did have basic parameter set data reading capabilities. The only requirement is that such previous vehicles also recorded extended parameter set data during the previous trips, so that it was possible to map the previous-trip driving data sets to appropriate extended historic groups.

In order to achieve the latter, it is preferred that the above-described graphical user interface providing piece of portable electronic device 130 software is arranged to measure the complete extended parameter set data during each current trip, and to report the measured extended parameter set data to the central server 150 for processing. Such measurement is preferably performed using sensor data locally available to such piece of software, preferably using sensor hardware integrated into the portable electronic device 130, even if could also be measured by the vehicle itself, or by device 120. This way, a software service used by the users of the present system can automatically record extended parameter set data, preferably in addition to basic or qualified parameter set data, in a way which is completely transparent to the user, for use by other current vehicles using the system.

In particular, it is preferred that the current vehicle is not arranged to automatically provide driving data information via an external interface. In this case, the present aspect is namely particularly useful. For instance, the present method can be used in a car without any such external interface, or when a required piece of hardware 120 is lacking or broken, by simply using a smartphone of the user or similar. The present invention is even useful for measuring driving performance for non-motorized vehicles, such as bicycles, as long as enough relevant previous-trip driving data sets with a relevant "driving quality" measurement have been recorded covering the currently used basic parameter set.

Hence, different systems may be implemented with particular adaptations to suit particular vehicle types, wherein a relevant selections are made with respect to basic, qualified and extended parameter sets, and the notion of "driving quality". For instance, "driving quality" for a bicycle with an electrical help motor could be related to the use of battery pack power.

It is furthermore preferred that only trusted vehicles, as described above, are allowed to update the extended group performance parameter values. This will improve data quality.

In case collections are used, as described above, it is preferred that the basic historic groups used for the purposes of calculating the extended group performance parameter are taken from the above described main collection.

General

In general, it is preferred to use basic historic groups, as described above, that are used to store information regarding previous-trip driving data sets mapped to such basic historic groups. Hence, it is preferred to, as a part of each basic historic group, store and update not only the group performance parameter, but also the above described trip performance parameters for current trips during which a current-trip driving data set was mapped to the basic historic group in question, notably the first trip performance parameter. Such parameter data which relates to the basic historic group as such is preferably updated dynamically as an average value of incoming data. For instance, this may be achieved by the currently updated parameter value being stored in one memory position in the database 151, and the number of previous updates in an additional memory position in the database 151. Then, as a new updated arrives, the latter number can be increased by one, and the basic historic group parameter can be updated according to the following, as an example:

$$P_{N+1} = \frac{P_N \cdot N + p}{N+1},$$

wherein N is the number of previous updates; P is the stored, average parameter value; and p is the incoming, new parameter value.

Apart from such average parameter values, it is furthermore preferred to store additional information for each basic historic group. One example is when a traffic accident occurs. An accident can be confirmed in various ways, such as by automatic detection based upon driving data sets, such as a rapid decrease in vehicle velocity followed by a standstill, or by manual registration. Once an accident has been confirmed, the system is preferably arranged to collect a predetermined number of current-trip driving data sets, and for each basic historic group to which the collected current-trip driving data sets are mapped, such as using the basic group conformance measure, update an accident risk parameter value stored for each such basic historic group. This update can be a simple counter which is increased by one each time this occurs for the basic historic group in question, or it may be an average value updated as described above. Hence, such an accident risk parameter, when used in the system over a prolonged time period during which a number of confirmed accidents occur, will be a measure of the probability of each basic historic group being observed during a trip leading to an accident. Hence, a separate trip performance parameter value can be calculated based upon the accident risk parameter values for basic historic groups to which current-trip driving data sets are mapped during a current trip, or the above described second trip performance parameter value can be calculated based at least partly upon such accident risk parameter values, in addition to the above described calculation, with the result of a trip performance parameter being accomplished which more accurately takes into consideration driving behaviour which is known to be risky.

Furthermore, the above described calculation of the second trip performance parameter during the current trip may be used to, during the current trip, predict a high risk of accidents for the current trip, based upon a poor value of the currently calculated second trip performance parameter. In this case, the system is arranged to provide a warning to the current driver.

This latter is made possible by the general property of a system according to the present invention to statistically relate driving effects on a macroscopic time scale to causes in terms of the driving behaviour on a microscopic time scale. This is a key insight of the present inventor.

It is noted, in connection to this calculation of the accident risk parameter value, that a pattern of mapped basic historic groups is preferably not identified and stored as such in connection to an accident and for the purposes of identifying particularly accident-prone patterns; instead, individual information is stored for each individual basic historic group, and a trip performance parameter value is then calculated based upon the individual basic historic groups and the data. Since the number of basic historic groups is large, preferably at least 100.000 basic historic groups, more preferably at least 1.000.000, the resulting trip parameter value will still in general be an accurate measure of the metric being measured, as applicable. This is true in general for all the above-described aspects of the present invention.

The longer the system is used, the more data, in terms of updated basic historic groups, each on average having been updated with many previous-trip driving data sets, the database 151 will contain. As a result, resulting calculated trip performance parameters will become more and more accurate, even for current vehicles that have previously not been connected to the system. Hence, the system is, in this regard, a "learning" system in the sense that it is automatically improved during use.

Regarding the above-described trusted vehicles, according to one preferred embodiment there is a parameter in the system which is settable so that certain selected trusted vehicles are associated with an increased weight when updating system data. Then, such trusted vehicles can be used to quickly adapt the system, in terms of vehicle class definitions (class-defining parameter values) and basic historic group data (in particular group performance parameter values), when for instance new car models are launched. In one preferred example, such selected trusted vehicles are associated with an increased weight of at least 5, preferably at least 10, times a default weight of a trusted vehicle. Hence, when previous-trip driving data sets are collected for such a trusted vehicle, this data counts as at least 5, preferably at least 10, such previous-trip driving data sets collected at the same time, and all parameter value updates are performed using this weight. As described above, this may lead to a new vehicle class automatically being created for such a newly released car model, but it may also lead to an existing vehicle class definition being adapted to the new car model, depending on how different the new car model is from already observed previous vehicles. In one preferred embodiment, such higher-weight updates only apply to class-defining parameters, and not to, for instance, group performance parameter values.

According to one preferred embodiment, each basic historic group is associated with a data quality parameter value, indicating the data quality of the group performance parameter for the basic historic group in question. According to one embodiment, such data quality parameter can indicate whether or not a previous-trip driving data set has been mapped to the basic historic group in question. In case this is not so for a particular basic historic group, the group performance parameter may be excluded from the calculation of the above described trip performance parameters described above. This may, for instance, be accomplished by the basic historic group in question being ignored for the purposes of such calculation. In case fewer than a predetermined percentage of the observed current-trip driving data sets can be mapped to a respective basic historic group the data quality parameter of which indicates a less than full quality, this may be indicated by the system, for instance by displaying a warning to the user of the current vehicle indicating that the calculated trip performance parameter is of potentially poor quality. The predetermined percentage is preferably between 50% and 90%. Alternatively, the relative percentage of full-quality basic historic groups can be used to calculate a confidence interval with respect to a calculated trip performance parameter, and then displayed to the current driver.

Once a previous-trip driving data of a trusted vehicle set is mapped to the basic historic group in question, the data quality parameter may be updated, so as to reflect a higher state of data quality. According to one preferred embodiment, the group performance parameter is updated even before this happens, based upon previous-trip driving data sets of non-trusted vehicles that are mapped to the basic historic group in question. Then, once the data quality parameter is set to indicate a higher data quality, the hence updated group performance parameter will become available for use when calculating trip performance parameters. This approach has turned out to provide accurate trip performance parameter values while still keeping the system simple yet dynamically adaptive.

Furthermore, as described above, the basic historic groups of different collections may be updated as a result of collected previous-trip driving data sets for vehicles of different vehicle classes. This, in turn, will in general lead to different collections comprising differently frequently updated group performance parameters, and data of different collections hence having different data quality. In this case, it is preferred for the system to comprise functionality for periodically investigate whether basic historic groups have data quality parameters that are set to indicate higher data quality, and for which corresponding basic historic groups of other collections do not have data quality parameters that are set to indicate higher data quality. If this is found to be the case, the respective group performance parameter values of basic historic groups with lower data quality may be updated using respective group performance parameter values of corresponding basic historic groups, in other collections, with higher data quality. "Corresponding" basic historic groups, in this context, preferably means basic historic groups with identical definition. The update is in this case preferably performed as a weighted average calculation of the lower-quality group performance parameter, wherein the weight of the higher-quality group performance parameter is lower than the weight of the lower-quality group performance parameter. Preferably, such updates between different collections only takes place between collections the corresponding classes of which are more similar than a predetermined value, which similarity is measured and calculated using a certain vehicle class similarity measure. This class similarity measure is arranged to measure similarity between two vehicle classes based upon the respective class-defining parameters of the classes in question.

A similar method can be used when a new class is defined. In this case, a set of basic historic groups can be copied from the collection corresponding to another class which is sufficiently "close" the newly created class to the collection corresponding to the new class, which set of basic historic groups have full data quality as indicated by said data quality parameters. In this case, it is preferred that the respective group performance parameters of such copied in basic historic groups are given less weight than normal during data updates in the collection corresponding to the newly created class, so that the convergence of the collection is quicker as driving data sets are being collected for vehicles of the newly created class. Furthermore, it is preferred that a characteristic vehicle velocity function is copied from such a "close" class, and used for the newly created class. Thereafter, the copied characteristic function will be updated by collected driving data sets for the newly created class vehicles.

As described above, it is preferred not to store a pattern of basic historic groups to which driving data sets have been mapped during a trip resulting in an accident. However, there are cases in which a pattern of mapped basic historic groups is identified, and even stored.

One such example is for driver identification. It has turned out that the basic historic groups to which current-trip driving data sets are mapped for each particular driver follows a statistical pattern which may be different enough between drivers so as to be used for driver identification. Hence, according to one preferred embodiment, the driver of each previous vehicle is identified, and a respective statistical pattern of mapped basic historic groups, corresponding to collected previous-trip driving data sets, is identified and stored for each driver, for several previous trips made by each such driver. Then, the current driver can be identified by a statistical comparison between the stored statistical patterns for the users and the pattern of mapped basic historic groups during the current trip. Such comparison can be performed in any manner which is conventional as such, and would typically result in one of said stored statistical patterns that represents the best match to the pattern produced during the current trip.

A "pattern", as used herein, may comprise information both regarding the identity of mapped basic historic groups; data contents of mapped basic historic groups; and/or mapping frequency of basic historic groups; or any combination of such parameters. It is preferred, when determining such a pattern, that data from several previous trips, such as at least 20 previous trips, of the same driver are used for such determination; and also that the previous-trip driving data sets for such trips is filtered so as to remove outlier data points.

In particular, in one preferred embodiment, such driver identification may be used to automatically stop a vehicle, or set off an alarm, if a driver which has not been previously authorized to drive the current vehicle drives the current vehicle. To this end, the system may comprise a piece of hardware in the current vehicle arranged to stop the vehicle in a suitable way, such as after providing repeated warnings to the driver.

In another preferred embodiment, driver identification data is stored in the central database 151 for all or some previous trips, and may be used to retroactively map particular drivers to particular previous trips, for instance for the purpose of automatically updating driving journals, to produce driving statistics or to investigate who drove a particular vehicle during a particular previous trip for insurance purposes. The stored data may also, for instance, be used to verify that a particular person is actually the driver in a motor competition or similar.

In one preferred embodiment, a pattern for a particular driver is used irrespectively of which vehicle and which vehicle class is used during the current trip.

In an application similar to the above described pattern determination, basic historic groups mapped by previous-trip driving data sets observed for the driver in question are analysed, and it is identified in what basic parameter set intervals, such as in what velocity intervals, the group performance parameter values of the mapped basic historic groups corresponding to those intervals are lowest. Then, this interval information is presented to the user, and used to direct the attention of the user to certain fields of improvement regarding the user's driving skills.

In one preferred embodiment, the current vehicle does not have the capability to produce user-readable fuel-consumption data during the current trip. In this case, the system is arranged to calculate the fuel consumption for the current trip based upon relative energy consumption-based group performance parameter values for basic historic groups to which current-trip driving data sets are mapped. This calculation is straight-forward but depends on the detailed implementation of said performance parameter. The present inventor has discovered that such calculated fuel consumption may be surprisingly accurate, even in the case in which the basic parameter set does not comprise fuel consumption and when there is no fuel consumption value available for readout from the current vehicle.

In one preferred embodiment, the current driver is an automated driver, such as a software- and/or hardware implemented robot or autopilot.

Further applications for the present invention is to assessing how difficult it is to drive a certain stretch of road, in relative terms as compared to other stretches of road and with respect to energy consumption and driving riskiness, by performing a number of trips along the road in question and noting an average first and/or second trip performance parameter value for such trips in relation to average corresponding trip performance parameter values for other stretches of road.

Example

Figure 16:
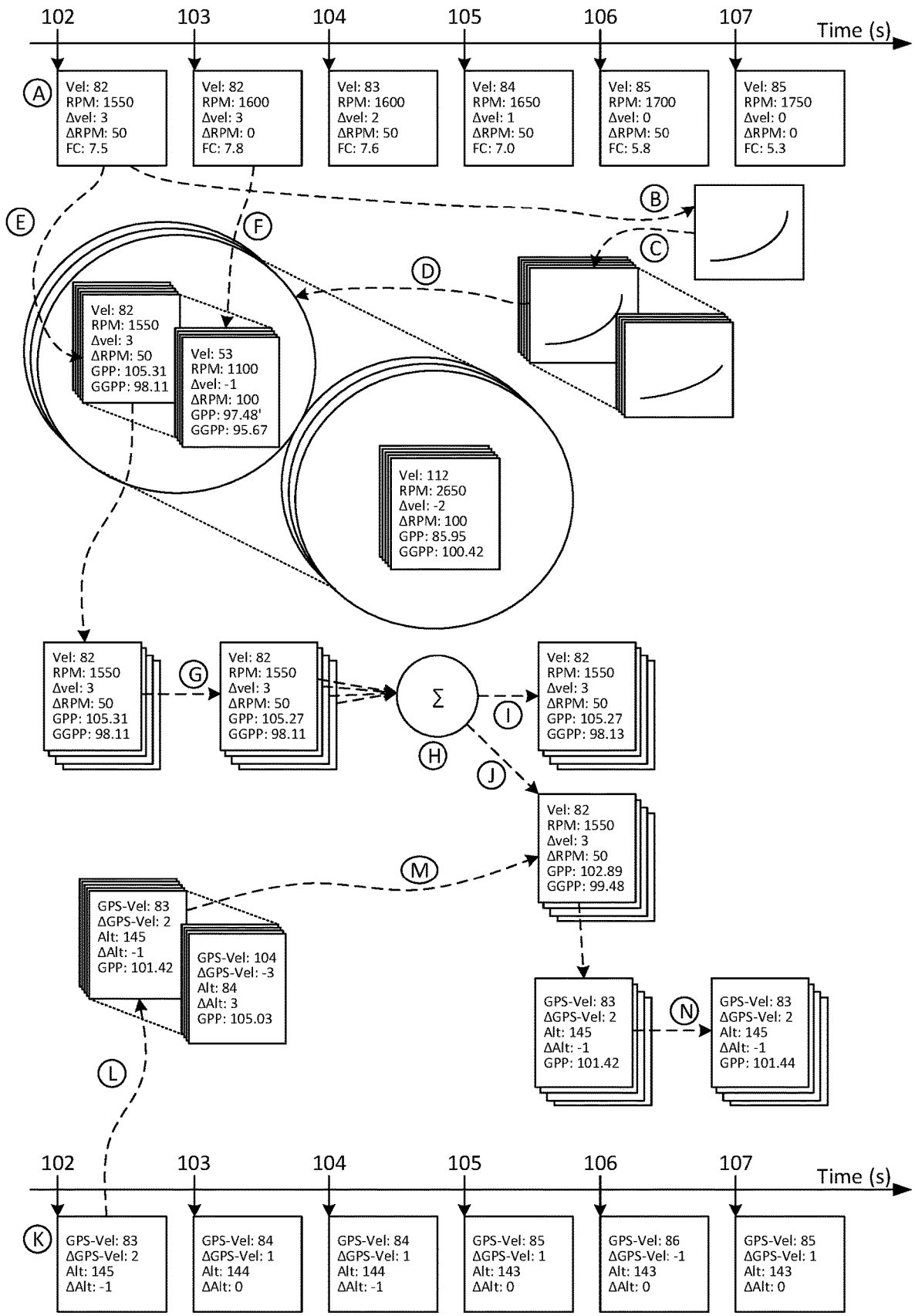
FIGS. 16-17 are simplified illustrations of respective exemplifying embodiments of the present invention.
Figure 17:
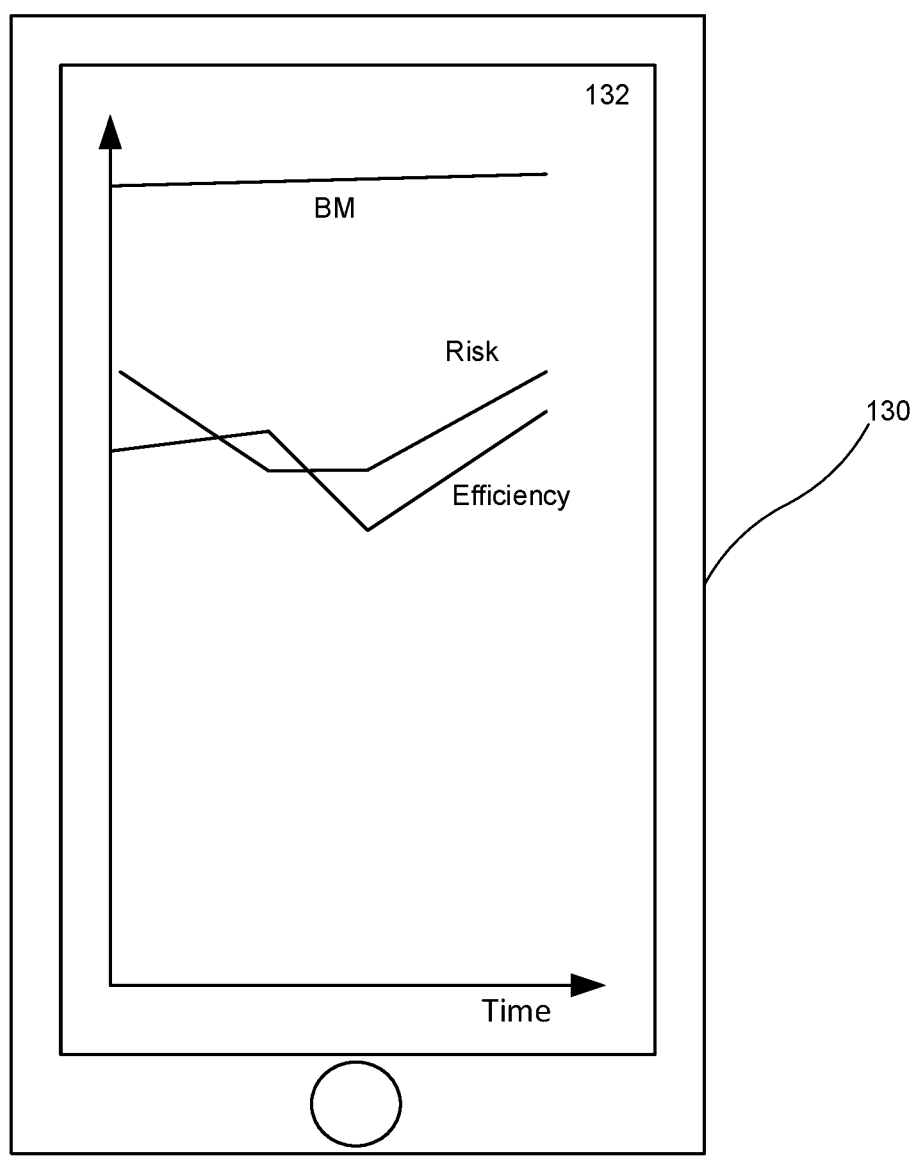

FIGS. 16 and 17 illustrate an example of an embodiment of the present invention, for a more detailed understanding of the same.

In FIG. 16, a series of observed and collected previous-trip driving data sets are shown (FIG. 16, top) along a time axis. The driving data sets are observed at consecutive time points, one second apart, starting at time=102 seconds. Each previous-trip driving data set comprises the following data values, which are made available by the previous vehicle during driving and for readout as described above, and communicated to the central server 150 (and/or to the local server 160, as the situation may be):

A predetermined qualified parameter set comprising
  A predetermined basic parameter set, in turn comprising
    Instantaneous vehicle velocity, "Vel" (km/h)
    Instantaneous engine rotation speed, "RPM" (RPM)
    Instantaneous vehicle velocity change as measured from the observation point and forwards 5 seconds, "ΔVel" (km/h)
    Instantaneous engine rotation speed change as measured from the observation point and forwards 1 second, "ΔRPM" (RPM)
  Instantaneous fuel consumption, "FC" (litres per 10 km)

As seen in FIG. 16, the vehicle velocity measured by the previous vehicle increases, from time point 102 to time point 107, from 82 to 85. At the same time, the engine rotation speed increases from 1550 to 1750. These shifts are also reflected in the change parameter values. It is realized that the actual processing of the previous-trip driving data set observed at time 102 will not actually be performed by the central 150 or local 160 server until time 106, when the velocity change is known.

Simultaneously as the above data is collected from the previous vehicle itself, previous-trip extended driving data sets (see FIG. 16, bottom) are also collected by a smartphone 130 held in the previous vehicle by the driver (in this exemplifying embodiment). The observation time points are identical (time points 102-107, with 1 second apart), but the extended driving data observed, collected and communicated to the server in question comprises the following data values:

A predetermined extended parameter set comprising
   Instantaneous GPS-based velocity, "GPS-Vel" (km/h)
   Instantaneous altitude, "Alt" (meters above sea level)
   Instantaneous GPS-based velocity change as measured from the observation point and forwards 5 seconds, "ΔVel" (km/h)
   Instantaneous altitude change as measured from the observation point and forwards 1 second, "ΔVel" (meters)

It is noted that the extended parameter set does not comprise instantaneous fuel consumption.

Hence, in a step A, the previous-trip driving data set at time point 102 is collected and communicated to the central server 150. In a step B, the driving data set in question, or more precisely, the velocity- and engine rotation speed data comprised in the data set, is used to update a current characteristic engine rotation speed to velocity curve for the present class of vehicles. In a step C, the class conformance measure is used to map said characteristic curve to one particular of a set of available and dynamically updated vehicle classes. In step D, the identified class is used to find a corresponding collection, among several such collections (displayed as circles in FIG. 16), each corresponding to a particular one of said vehicle classes. In the present example, the vehicle class may cover, for instance, middle-sized station wagon cars. It is noted that the present system has grouped these vehicles together in such a class completely automatically, without any presupposed knowledge about how to group vehicles or vehicle properties.

Then, in a step E, the previous-trip driving data set in question is mapped, using the group conformance measure, to a corresponding basic historic group, among many such available groups in said collection. In the present example, the velocity and velocity change values are measured in 1 km/h intervals; and the engine rotation speed and engine rotation speed change are measured in 50 RPM intervals, which is the same as used for basic historic group definitions, which is hence also based upon the same interval sizes. Therefore, the mapped basic historic group contains the same basic parameter set data as the previous-trip driving data set. This provides for very rapid lookup functionality in the system, in particular when using said classes and collections.

In a later performed step F, the previous-trip driving data set observed at time 103 is processed in a similar way, and is mapped to another basic historic group.

It is preferred that the vehicle is not allowed to change vehicle class during a trip. As a result, step B may be performed for all previous-trip driving data sets at a single, later time.

After step E, in a step G, the mapped basic historic group in question is updated with respect to its group performance parameter (GPP) value. This step is in fact taken after the previous trip is finished, or alternatively, if performed during the previous trip, under the assumption that the previous trip up to the time 102 is the total previous trip. For the total previous trip then, the total average fuel consumption is read from the previous vehicle, and the instantaneous fuel consumption, namely 7.5 litres per 10 km, for the previous-trip driving data set in question is divided by the total average fuel consumption. The result is a percentage value, indicating the relative fuel consumption at the small time window of 1 second at time point 102, as compared to the whole trip. In this case, the average fuel consumption for the previous-trip driving data set in question was lower than previously noted (on average) for that particular basic historic group in that particular collection, why the GPP of the basic group is decreased from 105.31 to 105.27, meaning that the average relative fuel consumption for previous-trip driving data sets previously mapped to that basic historic group is now 105.27%.

This is performed for all previous-trip driving data sets of the previous trip in question, or at least intermittently and under the assumption that the previous trip up to a particular previous-trip driving data set constitutes the total previous trip. Then, in a step H, the respective GPP values for all mapped basic historic groups for the total previous trip are summed, and an average GPP value is calculated for the trip. This value, which is the first trip performance parameter, is communicated to the device 130 and presented to the previous driver, preferably in relation to a benchmark value for first trip performance parameters as determined based upon corresponding calculations for previously performed previous trips (see FIG. 17).

In a step I, the general group performance parameter (GGPP) of each mapped basic historic group is also updated, using the calculated first trip parameter value. In this case, the first trip performance parameter value turned out to be 104.85, which is higher than the GGPP (98.11) of the basic historic group in question. Hence, its GGPP value is averaged up to 98.13. The corresponding is done for all mapped basic historic groups. Then, the second trip performance value is calculated by averaging all GGPP values for all mapped basic historic groups, and the second trip performance parameter is also communicated to the device 130 for display to the previous driver (FIG. 17).

Also, in a step J, for each mapped basic historic group, a main collection basic historic group is also identified, using the group conformance measure, and its GPP and GGPP measures are updated in a way which corresponds to the mapped basic historic groups of the collection corresponding to the vehicle class to which the previous vehicle belongs. It is noted that the mapped main collection basic historic group has GPP and GGPP values that are different from those for the corresponding non-main collection group, due to the fact that they have been updated historically using different previous-trip driving data sets.

In a step K, the extended previous-trip driving data set is collected at time point 102, that is the same or corresponding observation time point as the above described previous-trip driving data set. The extended driving data set is mapped, using an extended group conformance measure, to a corresponding extended historic group, among a set of many such extended historic groups. This mapping entirely corresponds to the mapping to the basic historic groups, as described above, and is also based upon identical intervals. The mapped extended group is further mapped to the main collection basic historic group described above, using the knowledge available to the system that the basic parameter- and extended parameter previous-trip driving data sets, respectively, were collected at the same time (at time point 102).

Then, in a step N, a GPP value of the mapped extended group is updated using the GPP value of said mapped main collection basic historic group, using an average function corresponding to the ones described above. Hence, the GPP value of the extended group is updated, based upon the GPP value 102.89 of the basic group, from 101.42 to 101.44, reflecting the fact that the GPP value of 102.89 is higher than 101.42.

In the case the previous trip is seen as a current trip, the same steps A-J are performed, with the goal of not only updating the basic historic group data, but also to calculate said first and second trip performance parameter values for presentation to the current driver.

In the particular case in which the current vehicle does not offer fuel consumption data, the updates in steps G, I and J are not performed, since there is no data available for doing those updates. However, the first and second trip performance parameters may still be calculated and presented to the current driver.

In case the previous or current vehicle is not a trusted vehicle, the updates are performed but a respective quality flag on each historic basic group may not be set to indicate full quality.

In the particular case in which no basic parameter data is available for readout from the current vehicle, steps A-J are not performed at all. Instead, steps K, L and M are performed, and the first and second trip performance parameters are calculated based upon the mapped extended groups corresponding to each collected extended previous-trip driving data set. The update in step N is not performed in this case.

Hence, for a current vehicle without an interface providing data on fuel consumption, the system may calculate trip performance values for the current trip. Even for a current vehicle without any readable data whatsoever trip performance values can be calculated for the current trip, as long as the extended data set is available for collection via a smartphone or other device present in the vehicle during the current trip.

FIG. 17 illustrates the screen 132 of device 130 (or any other screen in the current vehicle or elsewhere which is accessible to the current driver during or after a current trip) at the time of presenting the information. On the screen 132, information (BM=benchmark value, the historic 10% top performing trips with respect to first trip performance parameter; Efficiency=first trip performance parameter value for the current driver; and Risk=second trip performance parameter value for the current driver) provided from the central server 150 (or the local server 160, as the case may be) is displayed along a time axis (X-axis; the parameter values are displayed on the Y-axis), with one respective data point for each of the last three trips performed by the driver in question, in this case regardless of what vehicle was used. As can be seen in FIG. 17, the current driver has improved somewhat during his or her last three current trips. The current driver has a slightly higher risk score than driving efficiency score, but still has some ways up to being among the best-performing drivers. At the same time, the driver collective using the system has improved on average, increasing the BM value slightly over time.

In case the methodology described herein is followed for calculating the first and second trip performance parameters, it has turned out that the first trip performance parameter is an accurate measure of relative driving efficiency, regardless of vehicle, and that the second trip performance parameter is an accurate measure of driving riskiness, also regardless of vehicle.

Above, preferred embodiments have been described. However, it is apparent to the skilled person that many modifications can be made to the disclosed embodiments without departing from the basic idea of the invention.

It is generally noted, that the above described seven aspects of the present invention are freely combinable in any constellation, and individual details from one of said aspects are readily useful in any of the other aspects, as applicable.

In general, it is preferred that the present system does not perform any analysis of the current trip based upon geographic location of the vehicle or based upon map data. Instead, the system preferably completely relies upon current-trip driving data sets as collected during each trip and as compared to previous-trip driving data sets as described above.

If the basic historic groups are used, it is realized that the actual previous-trip driving data sets need not be stored in the database at all. Instead, after a previous-trip driving data set has been mapped to a basic historic group, and the basic historic group has been updated, such as with respect to its group performance parameter, the previous-trip driving data set may actually be discarded and not stored. Then, the information comprised in the previous-trip driving data set lives on in the database in the form of the definition of the basic historic group in combination with the updated group performance parameter value.

Moreover, each driving data set parameter value may be an instantaneously read value, or be measured over a certain small time period, such as about 1 second, and averaged across that small time period.

It is realized that vehicles of fundamentally different types, such as gasoline vehicles, completely electrical cars, boats, aeroplanes and bicycles, are preferably allotted to different instantiations of the present system, in order to achieve more relevant data comparisons between different vehicle classes. However, it is also possible to one single system for all such different vehicle types, since the vehicle classes will typically converge into a set of classes wherein different types of vehicles are properly represented, as long as the basic parameter set, the qualified parameter set and the extended parameter set (as applicable) are carefully selected.

Hence, the invention is not limited to the described embodiments, but can be varied within the scope of the enclosed claims.

Common Expressions and Definitions

Current trip=the trip which is performed by a particular driver and a particular vehicle now, and for which a trip performance parameter value is to be calculated.

Previous trip=a trip which was performed at least partially before the current trip.

Predetermined set of basic driving data parameters=basic parameter set=standard data set provided by vehicle.

Basic data set=observed set of parameter data comprising the basic parameter set.

Predetermined set of qualified driving data parameters=qualified parameter set=basic parameter set as well as instantaneous energy consumption.

Qualified data set=observed set of parameter data comprising the qualified parameter set.

Predetermined set of extended driving data parameters=extended parameter set=standard data set not entirely provided by vehicle.

Extended data set=observed set of parameter data comprising the extended parameter set.

Current-trip driving data set=set of parameter data observed during the current trip. A current-trip data set can be a current basic data set, a current qualified data set and/or a current extended data set.

Previous-trip driving data set=set of parameter data observed during a previous trip. A previous-trip data set can be a previous basic data set, a previous qualified data set and/or a previous extended data set.

Historic basic group of previous-trip driving data sets=basic historic group=the previous-trip data sets that are "similar" to each other according to the basic similarity measure.

Historic extended group of previous-trip driving data sets=extended historic group=the previous-trip driving data sets that are "similar" to each other according to the extended similarity measure.

Basic driving data set similarity measure=basic similarity measure=comparison measure for basic and qualified parameter set data sets.

Extended driving data set similarity measure=extended similarity measure=comparison measure for extended parameter set data sets.

Basic conformity measure for a driving data set to a historic group of previous-trip driving data sets=Basic group conformity measure=conformity measure between a basic or qualified parameter set data set and a basic historic group.

Basic conformity measure for the driving data sets for a particular vehicle to a set of class-defining parameters=Basic class conformity measure=conformity measure between a number of driving data sets for a vehicle and a certain parameterized characteristic information for a particular class of vehicles.

Extended conformity measure for a current-trip driving data set to a historic group of previous-trip driving data sets=Extended group conformity measure=conformity measure between an extended parameter set data set and an extended historic group.

Collection of previous-trip data sets=collection of previous-trip driving data sets or basic historic groups for all vehicles belonging to a certain class of vehicles.

Current class=the class to which the current vehicle belongs.

Current collection=the collection corresponding the class to which the current vehicle belongs.

Energy consumption-based group performance parameter=Energy-based group performance parameter=performance parameter calculated based upon energy consumption for previous-trip driving data sets of a particular basic historic group.

General group performance parameter=General group performance parameter=performance parameter for a particular basic historic group calculated based upon respective values of energy-based group performance parameters for other basic historic groups.

First energy consumption-based trip performance parameter=First energy-based trip performance parameter=performance parameter calculated for a current trip based upon energy consumption-based group parameters for basic historic groups.

Second energy consumption-based trip performance parameter=Second energy-based trip performance parameter=performance parameter calculated for a current trip based upon first energy-based trip performance parameter values for basic historic groups.

Current vehicle=the vehicle currently being driven, for which the performance parameter is to be calculated Driver=person or entity driving or controlling vehicle Characteristic instantaneous relative energy consumption curve=Function describing, for a particular vehicle class, a typical relationship between instantaneous vehicle velocity and relative energy consumption-based performance.

The invention claimed is:

1. A method for automatically assessing performance of a driver of a current vehicle for a particular current trip, wherein updated current-trip driving data sets are repeatedly read from the current vehicle, wherein each of the current-trip driving data sets comprises data from at least a predetermined set of basic driving data parameters, wherein new such current-trip driving data sets are read from the current vehicle at consecutive observation time points separated, at the most, by a predetermined observation time period, wherein the method comprises calculating the value of a first energy-based trip performance parameter by the steps:

a) collecting previous-trip driving data sets, observed at a plurality of different observation time points, for a plurality of different previous trips made by a plurality of different drivers and a plurality of different vehicles, the previous-trip driving data sets each comprises parameter values for at least a certain predetermined set of qualified driving data parameters in turn comprising the basic parameter set and in particular instantaneous vehicle energy consumption;
    b) for each of said current-trip driving data sets, selecting at least one corresponding previous-trip driving data set based upon a basic driving data set similarity measure, arranged to measure similarity between driving data sets, and/or based upon a basic group conformity measure arranged to measure conformity for a current-trip driving data set to a basic historic group of previous-trip driving data sets;
    c) calculating a relative instantaneous vehicle energy consumption value for said selected corresponding previous-trip driving data set or sets, the relative energy consumption is relative to a total energy consumption for a respective trip during which the previous-trip driving data set in question was observed; and
    d) calculating a value of the first trip performance parameter based upon an average value of said calculated relative instantaneous energy consumptions.

2. The method according to claim 1, wherein said previous-trip driving data sets are classified into one of a plurality of different predetermined basic historic groups based upon said basic similarity measure, wherein each current-trip driving data set is mapped to at the most one of said basic historic groups based upon said basic group conformity measure.

3. The method according to claim 2, wherein said relative instantaneous vehicle energy consumption value is calculated for the respective previous-trip driving data sets in the basic historic group to which the current-trip driving data set in question is mapped, in relation to a total energy consumption for the complete trip during which the previous-trip driving data set in question was observed.

4. The method according to claim 3, wherein the first trip performance parameter is calculated based upon an average value of said relative instantaneous energy consumption values for said mapped respective basic historic groups.

5. The method according to claim 2, wherein the basic parameter set comprises instantaneous vehicle velocity, wherein the method further comprises a step in which, for said basic historic groups, a characteristic vehicle velocity function is calculated regarding the value of said relative instantaneous vehicle energy consumption for different vehicle velocity parameter values, and wherein the first trip performance parameter value is further calculated based upon a weighting of said relative instantaneous energy consumption values using said characteristic vehicle velocity function.

6. The method according to claim 1, wherein the method further comprises the steps of classifying said previous-trip driving data sets into a set of collections, wherein each of said collections only comprises previous-trip driving data sets for a particular class of vehicles, wherein all previous-trip driving data sets of one and the same vehicle are classified into one and the same collection, based upon a basic class conformity measure between driving data sets for the current vehicle and a set of class-defining parameters; classifying the current vehicle into a particular current class of said set of classes based upon said basic class conformity measure; wherein the first trip performance parameter value is calculated based upon only the respective relative instantaneous vehicle energy consumption values for previous-trip driving data sets in said current collection.

7. The method according to claim 6, wherein the said basic parameter set comprises instantaneous vehicle velocity and instantaneous engine rotation speed, and wherein the class-defining parameters comprise, for each class of vehicles, a characteristic engine rotation speed for a particular vehicle velocity.

8. The method according to claim 1, wherein said predetermined observation time period is at the most 10 seconds.

9. The method according to claim 1, wherein parameter values of said basic parameter set are automatically recorded by the current vehicle and either communicated to a portable electronic device arranged at the current vehicle, the portable electronic device communicates, via a wireless link, said parameter values to a central server, or communicated, via a wireless link, directly from the current vehicle to said central server.

10. The method according to claim 1, wherein the first trip performance parameter value is calculated by and communicated, via a wireless link, from a central server to the current vehicle, such as to a portable electronic device arranged at the current vehicle, and presented to the driver.

11. The method according claim 10, wherein a value of the first trip performance parameter is calculated repeatedly, at least every 10 minutes, during the current trip, wherein the current trip is considered to be the current trip up to the moment at which the value of the first trip performance parameter is calculated and for the purposes of calculating the first trip performance parameter value in question, and wherein the currently calculated such value is communicated to the current vehicle and presented to the driver upon calculation.

12. The method according to claim 1, wherein each of said previous-trip driving data sets is observed at a respective one of said plurality of different observation time points, and wherein the parameter values of the previous-trip driving data sets are each read either as a respective instantaneous value or a respective average value read across a certain respective time period of at the most 5 seconds of length.

13. The method according to claim 1, wherein said predetermined observation time period is at the most 5 seconds.

14. The method according to claim 1, wherein said predetermined observation time period is at the most 2 seconds.

15. The method according claim 10, wherein a value of the first trip performance parameter is calculated repeatedly, at least every 2 minutes, during the current trip, wherein the current trip is considered to be the current trip up to the moment at which the value of the first trip performance parameter is calculated and for the purposes of calculating the first trip performance parameter value in question, and wherein the currently calculated such value is communicated to the current vehicle and presented to the driver upon calculation.

16. The method according claim 10, wherein a value of the first trip performance parameter is calculated repeatedly, at least every 30 seconds, during the current trip, wherein the current trip is considered to be the current trip up to the moment at which the value of the first trip performance parameter is calculated and for the purposes of calculating the first trip performance parameter value in question, and wherein the currently calculated such value is communicated to the current vehicle and presented to the driver upon calculation.

17. A system for automatically assessing performance of a driver of a current vehicle for a particular current trip, the system is arranged to repeatedly read updated current-trip driving data sets from the current vehicle, wherein each of the current-trip driving data sets comprises data from at least a predetermined set of basic driving data parameters, wherein the system is arranged to read new such current-trip driving data sets from the current vehicle at consecutive observation time points separated, at the most, by a predetermined observation time period, wherein the system comprises a server arranged to calculate the value of a first energy-based trip performance parameter, wherein the server is arranged to collect previous-trip driving data sets, observed at a plurality of different observation time points, for a plurality of different previous trips made by a plurality of different drivers and a plurality of different vehicles, the previous-trip driving data sets each comprises parameter values for at least a certain predetermined set of qualified driving data parameters in turn comprising the basic parameter set and in particular instantaneous vehicle energy consumption, wherein the server is arranged to, for each of said current-trip driving data sets, select at least one corresponding previous-trip driving data set based upon a basic driving data set similarity measure, arranged to measure similarity between driving data sets, and/or based upon a basic group conformity measure arranged to measure conformity for a current-trip driving data set to a basic historic group of previous-trip driving data sets, wherein the server is arranged to calculate a relative instantaneous vehicle energy consumption value for said selected corresponding previous-trip driving data set or sets, the relative energy consumption is relative to a total energy consumption for a respective trip during which the previous-trip driving data set in question was observed, and wherein the server is arranged to calculate a value of the first trip performance parameter based upon an average value of said calculated relative instantaneous energy consumptions.

18. The system according to claim 17, wherein the system is arranged to observe each of said previous-trip driving data sets is at a respective one of said plurality of different observation time points, and wherein the system is arranged to read the parameter values of the previous-trip driving data sets either as a respective instantaneous value or a respective average value read across a certain respective time period of at the most 5 seconds of length.

* * * * *